United States Patent
Gray et al.

(10) Patent No.: US 12,238,548 B2
(45) Date of Patent: *Feb. 25, 2025

(54) SYSTEMS AND METHODS FOR COMMUNICATIONS NODE UPGRADE AND SELECTION

(71) Applicant: Level 3 Communications, LLC, Broomfield, CO (US)

(72) Inventors: William Gray, Boulder, CO (US); James Sayre, Boulder, CO (US); Stephen Limburg, Boulder, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,139

(22) Filed: Jul. 12, 2023

(65) Prior Publication Data

US 2023/0354069 A1    Nov. 2, 2023

Related U.S. Application Data

(63) Continuation of application No. 17/562,205, filed on Dec. 27, 2021, now Pat. No. 11,706,645, which is a
(Continued)

(51) Int. Cl.
*G06N 3/02*    (2006.01)
*G06N 20/00*    (2019.01)
(Continued)

(52) U.S. Cl.
CPC .............. *H04W 24/06* (2013.01); *G06N 3/02* (2013.01); *G06N 20/00* (2019.01); *G06Q 10/04* (2013.01);
(Continued)

(58) Field of Classification Search
CPC ............... H04B 10/27; H04B 17/3912; H04B 17/3913; G06N 3/02; G06N 3/042;
(Continued)

(56) References Cited

U.S. PATENT DOCUMENTS 6,345,239 B1    2/2002  Bowman-Amuah
6,606,744 B1    8/2003  Mikurak
(Continued)

FOREIGN PATENT DOCUMENTS

WO    WO-199966738    12/1999
WO    WO-2014093717    6/2014

OTHER PUBLICATIONS

Canadian Examination Report, dated Jun. 15, 2023, Application No. 3130892, filed Feb. 19, 2020; 3 pgs.
(Continued)

*Primary Examiner* — Frank Duong

(57) ABSTRACT

Implementations described and claimed herein provide systems and methods for intelligent node type selection in a telecommunications network. In one implementation, a customer set is obtained for a communications node in the telecommunications network. The customer set includes an existing customer set and a new customer set. A set of customer events is generated for a node type of the communications node using a simulator. The set of customer events is generated by simulating the customer set over time through a discrete event simulation. An impact of the customer events is modeled for the node type of the communications node. The node type is identified from a plurality of node types for a telecommunications build based on the impact of the customer events for the node type.

16 Claims, 14 Drawing Sheets

Related U.S. Application Data continuation of application No. 16/795,225, filed on Feb. 19, 2020, now Pat. No. 11,246,044.

(60) Provisional application No. 62/808,183, filed on Feb. 20, 2019, provisional application No. 62/808,189, filed on Feb. 20, 2019.

(51) Int. Cl.

| | |
|---|---|
| *G06Q 10/04* | (2023.01) |
| *H04B 10/27* | (2013.01) |
| *H04L 12/28* | (2006.01) |
| *H04L 41/0893* | (2022.01) |
| *H04L 41/12* | (2022.01) |
| *H04L 41/14* | (2022.01) |
| *H04L 41/16* | (2022.01) |
| *H04Q 3/00* | (2006.01) |
| *H04Q 11/00* | (2006.01) |
| *H04W 16/18* | (2009.01) |
| *H04W 24/02* | (2009.01) |
| *H04W 24/06* | (2009.01) |
| *H04W 64/00* | (2009.01) |

(52) U.S. Cl.
CPC ......... *H04B 10/27* (2013.01); *H04L 12/2861* (2013.01); *H04L 41/0893* (2013.01); *H04L 41/12* (2013.01); *H04L 41/145* (2013.01); *H04L 41/16* (2013.01); *H04Q 3/0025* (2013.01); *H04Q 3/0029* (2013.01); *H04Q 11/0067* (2013.01); *H04W 16/18* (2013.01); *H04W 24/02* (2013.01); *H04W 64/003* (2013.01)

(58) Field of Classification Search
CPC ...... G06N 3/044; G06N 3/0442; G06N 3/045; G06N 3/0455; G06N 3/0464; G06N 3/0499; G06N 3/08; G06N 3/088; G06N 3/09; G06N 3/091; G06N 3/092; G06N 20/00; G06N 20/10; G06Q 10/04; H04L 12/2861; H04L 25/0254; H04L 25/03165; H04L 2012/05686; H04L 2025/03464; H04L 41/0893; H04L 41/12; H04L 41/145; H04L 41/16; H04L 45/08; H04Q 3/0025; H04Q 3/0029; H04Q 11/0067; H04W 16/18; H04W 16/22; H04W 24/02; H04W 24/06; H04W 64/003

See application file for complete search history.

(56) References Cited

U.S. PATENT DOCUMENTS

| | | | |
|---|---|---|---|
| 7,085,697 B1 | 8/2006 | Rappaport | |
| 7,620,716 B2 | 11/2009 | Pirzada et al. | |
| 8,565,404 B2 | 10/2013 | Shaffer et al. | |
| 10,142,187 B2 | 11/2018 | Nahata | |
| 10,346,862 B2 * | 7/2019 | Ramamoorthy | .... H04L 41/0806 |
| 2005/0169452 A1 | 8/2005 | Prigogin | |
| 2009/0222540 A1 | 9/2009 | Mishra et al. | |
| 2009/0296584 A1 | 12/2009 | Bernard et al. | |
| 2013/0317945 A1 | 11/2013 | Doleweerd et al. | |
| 2015/0373207 A1 | 12/2015 | Day et al. | |
| 2016/0077538 A1 | 3/2016 | Berka | |
| 2017/0116626 A1 | 4/2017 | Ramamoorthy | |
| 2019/0372857 A1 | 12/2019 | Gandhi | |
| 2020/0267058 A1 | 8/2020 | Gray | |
| 2020/0267455 A1 | 8/2020 | Gray | |
| 2020/0267498 A1 | 8/2020 | Draper | |
| 2020/0267569 A1 | 8/2020 | Gray | |
| 2020/0267580 A1 | 8/2020 | Gray | |
| 2022/0124523 A1 | 4/2022 | Gray | |

OTHER PUBLICATIONS

Canadian Examination Report, dated Jun. 7, 2023, Application No. 3130893, filed Feb. 19, 2020; 2 pgs.
Extended European Search Report, dated Feb. 22, 2023, Application No. 20758518.3, Filed Feb. 19, 2020; 13 pgs.
Extended European Search Report, dated Sep. 8, 2022, Application No. 22168217.2, filed Feb. 19, 2020; 13 pgs.
International Preliminary Report on Patentability, dated Sep. 2, 2021, Int'l Appl. No. PCT/US20/01887; Int'l Filing Date Feb. 19, 2020; 9 pgs.
International Preliminary Report on Patentability, dated Sep. 2, 2021, Int'l Appl. No. PCT/US20/018885, Int'l Filing Date Feb. 19, 2020; 10 pgs.
International Preliminary Report on Patentability, dated Sep. 2, 2021, Int'l Appl. No. PCT/US20/018892, Int'l Filing Date Feb. 19, 2020; 11 pgs.
International Search Report and Written Opinion of the International Searching Authority, dated Jul. 16, 2020, Int'l Appl. No. PCT/US20/018877, Int'l Filing Date Feb. 19, 2020; 13 pgs.
International Search Report and Written Opinion of the International Searching Authority, dated Jun. 10, 2020, Int'l Appl. No. PCT/US20/018892, Int'l Filing Date Feb. 19, 2020; 15 pgs.
International Search Report and Written Opinion of the International Searching Authority, dated Jun. 2, 2020, Int'l Appl. No. PCT/US20/018885, Int'l Filing Date Feb. 19, 2020; 13 pgs.
Partial Supplementary European Search Report, dated Nov. 21, 2022, Application No. 20758518.3, filed Feb. 9, 2020; 16 pgs.
Kokangul, A et al., "Optimization of passive optical network planning", *Applied Mathematical Modeling* vol. 35 2011 , pp. 3345-3354.
Ouali, Anis et al., "Towards Achieving Practical CPON FTTH Designs", IEEE 20th International Workshop on Computer Aided Modeling and Design of Communication Links and Networks (CAMAD) 2015 , pp. 108-113.
Ucar, Inaki et al., "simmer: Discrete-Event Simulation for R", Arxiv.org, Cornell Univ. Library, 201 Olin Library Cornell Univ Ithaca, NY 14853; XP081453789 May 27, 2017 , pp. 1-31.
Canadian Examination Report, dated Feb. 8, 2024, Application No. 3130892, filed Feb. 19, 2020; 4 pgs.

* cited by examiner

SYSTEMS AND METHODS FOR COMMUNICATIONS NODE UPGRADE AND SELECTION

TECHNICAL FIELD

Aspects of the present disclosure relate to a method and system for intelligently upgrading or adding nodes in a communications network according to one or more distinct investment clusters, and in particular to an artificial intelligence network for simulating customer events over time for a node in a communications network and generating a model of an impact of the customer events from which nodes may be added or the node upgraded.

BACKGROUND

Communications networks provide Internet service to a plethora of customers having disparate preferences on service types and price points. Such communications networks generally include one or more wire centers dispersed in the regions serviced by the network. A wire center connects to a plurality of sites, such as living units, business units, and/or the like, associated with the customers via one or more communications nodes, such as cross connects. Each of the communications nodes may involve a different node type, such as central office fed internet protocol (CoIP), fiber to the node (FTTN), fiber to the home/fiber to the premise (FTTH/FTTP), etc. The node type generally dictates the type of services that may be provided to a customer. Determining whether the node type of a particular communications node is suitable for the associated customer population is a labor intensive process involving significant resources and time. Further, the customer population for a given communications node may change dramatically over time, such that information is frequently outdated or incomplete. Exacerbating these challenges, if the decision is made to change the node type for the communications node, additional resources and time are expended to modify the structural architecture of the communications node in accordance with the new node type. Where this decision is made on outdated or incomplete information, these expenditures may be in vain, where the new node type fails to align to the preferences of the associated customer population. Additionally, if the change is not made timely, the associated customer population may decline.

It is with these observations in mind, among others, that various aspects of the present disclosure were conceived.

SUMMARY

Implementations described and claimed herein address the foregoing problems by providing systems and methods for intelligent node type selection in a telecommunications network. In one implementation, a customer set is obtained for a communications node in the telecommunications network. The customer set includes an existing customer set and a new customer set. A set of customer events is generated for a node type of the communications node using a simulator. The set of customer events is generated by simulating the customer set over time through a discrete event simulation. An impact of the customer events is modeled for the node type of the communications node. The node type is identified from a plurality of node types for a telecommunications build based on the impact of the customer events for the node type.

In another implementation, an existing customer set including a plurality of existing customers corresponding to a plurality of sites connected to a wire center through a communications node having a current node type is obtained. For each existing customer in the existing customer set, a first time until an upgrade event occurs for the first customer is determined, and a second time until a disconnect event occurs for the first customer is determined. A selection is made for each customer based on the whether the first time or the second time occurs next as a next event for that customer. The existing customer set is then sorted into a sorted customer set according to a time until the next event for each of the plurality of existing customers. The sorted customer set includes a first customer having a first occurring next event of the next events. A third time until a next event for existing customers or a new sales event occurs for a new customer is determined. A customer event is generated for the customers when the earlier of the first time and the second time occurs before the third time.

In another implementation, an existing customer set including a plurality of existing customers corresponding to a plurality of sites connected to a wire center through a communications node having a current node type is obtained. For each existing customer a simulation is independently completed, and then the simulations are combined to represent a fully simulated set of existing customers and new customers. The process to simulate each existing customer starts by identifying if there is an active service at the site. For sites with an active service, a first time until an upgrade event occurs is determined and a second time until a disconnect event occurs is determined. These two times are compared to determine the next event and next event time. This next event is then processed, and the simulation continues as a site without an active service. For sites without an active service, a time until a new sales event occurs for a new customer is determined. This sale is then processed, and the simulation continues as a site with an active service.

In another implementation, a wire center is deployed in a telecommunications network. A communications node connects a plurality of sites to the wire center. Each of the plurality of sites corresponds to at least one customer of a service provided by the telecommunications network. The communications node has a node type selected based on a model of an impact of customer events for the node type. The customer events are generated by simulating a customer set over time through a discrete event simulation.

In another implementation, a site footprint having a plurality of sites associated with a customer population of a telecommunications network is obtained. A fully connected buildable area is generated for the site footprint. The fully connected buildable area includes each of the plurality of sites having a connection to at least one neighboring site, such that an entirety of the plurality of sites are connection along a set of paths. A validated buildable area is generated from the fully connected buildable area by validating each of the connections of the plurality of sites based on at least one network constraint of the telecommunications network. The validated buildable area is limited to buildable connections between the plurality of sites. One or more buildable subgroups is generated based on the buildable connections of the plurality of sites. The one or more buildable subgroups each define a contiguous build area having a subset of the plurality of sites. At least one investment cluster is generated in at least one of the one or more buildable subgroups by clustering the subset of the plurality of sites according to at least one site category. A telecommunications build plan for providing the telecommunications services to the subset of the plurality of sites associated with the at least one investment cluster is generated.

In another implementation, a plurality of demographic parameters for a customer population associated with a telecommunications network is obtained. A plurality of site parameters for sites associated with the customer population of the telecommunications network is obtained. A site key having at least one of a subset of the plurality of demographic parameters or a subset of the plurality of site parameters is generated. The site key provides a penetration rate for a segment of the customer population associated with the telecommunication services. A simulation set for the site key is generated. The simulation set includes a plurality of simulations for the site key. Each of the plurality of simulations has a set of customer events for a telecommunications build type, and the set of customer events is generated by simulating a customer set for the site key over time through a discrete event simulation. The simulation set is stored in at least one database. Each of the plurality of simulations in the simulation set is selectable to generate a telecommunications build plan for providing the telecommunications services to a telecommunications buildable area of the telecommunications network.

In another implementation, a site type for a site in a telecommunications buildable area for providing telecommunication services in a telecommunications network is obtained. A telecommunications build type for the telecommunications buildable area is obtained. A site key is identified from a plurality of site keys by matching the site type to the site key. A set of customer events for the site and the telecommunications build type is extracted based on a simulation of the site key. A telecommunications build plan for the telecommunications buildable area is generated using the set of customer events.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve intelligent upgrade and selection of nodes in a communication network. In one aspect, an artificial intelligence network includes a neural network, a simulator, and a modeler for determining whether to upgrade or otherwise change a node type of a communications node. The neural network generates dynamic simulation inputs for the communications node that may change over time, such as customer demographics, competitor information, regional information, and/or the like to determine an expected penetration. The dynamic simulation inputs may be used to generate a new customer set based on a new sales rate and an offer distribution. A customer set for the communications node is generated based on the new customer set and an existing customers set. The simulator simulates the customer set over time as a discrete event simulation for a node type and outputs customer events. The customer events indicate how the customer population for the communications node changes over time. The modeler generates a model of an impact of the customer events. The impact may include performance analytics for the communications node for the node type. The performance analytics for each node type may be compared to determine whether to modify the node type for the communications node, add additional nodes, and in some events remove a node thereby altering the overall network configuration.

In some cases, one or more communications nodes may involve disparate groups, each representing distinct demographics or network characteristics, such that modeling an impact of customer events for a single communications node as a whole provides an incomplete assessment of whether to alter the network configuration. As such, in one aspect, an impact of customer events is modeled at an investment cluster level rather than at a communications node level. To identify one or more investment clusters for modeling, a dataset involving various sites is pre-partitioned based on geography into site footprints. Within each site footprint, one or more buildable areas are defined, breaking up the site footprint into one or more logical groupings of sites. Each of the buildable areas is clustered into one or more investment clusters, each with a subset of sites sharing common demographic and/or network characteristics. The simulator simulates a customer set corresponding to each subset of sites for an investment cluster over time as a discrete event simulation for a network modification and outputs customer events. The modeler generates a model of an impact of the customer events for the investment cluster, which may include performance analytics for the network modification for determining whether to upgrade or otherwise alter the network configuration for the investment cluster. For example, the performance analytics may be used to determine whether to build out a Gigabit Passive Optical Network (GPON) overlay for the investment cluster.

Figure 1:
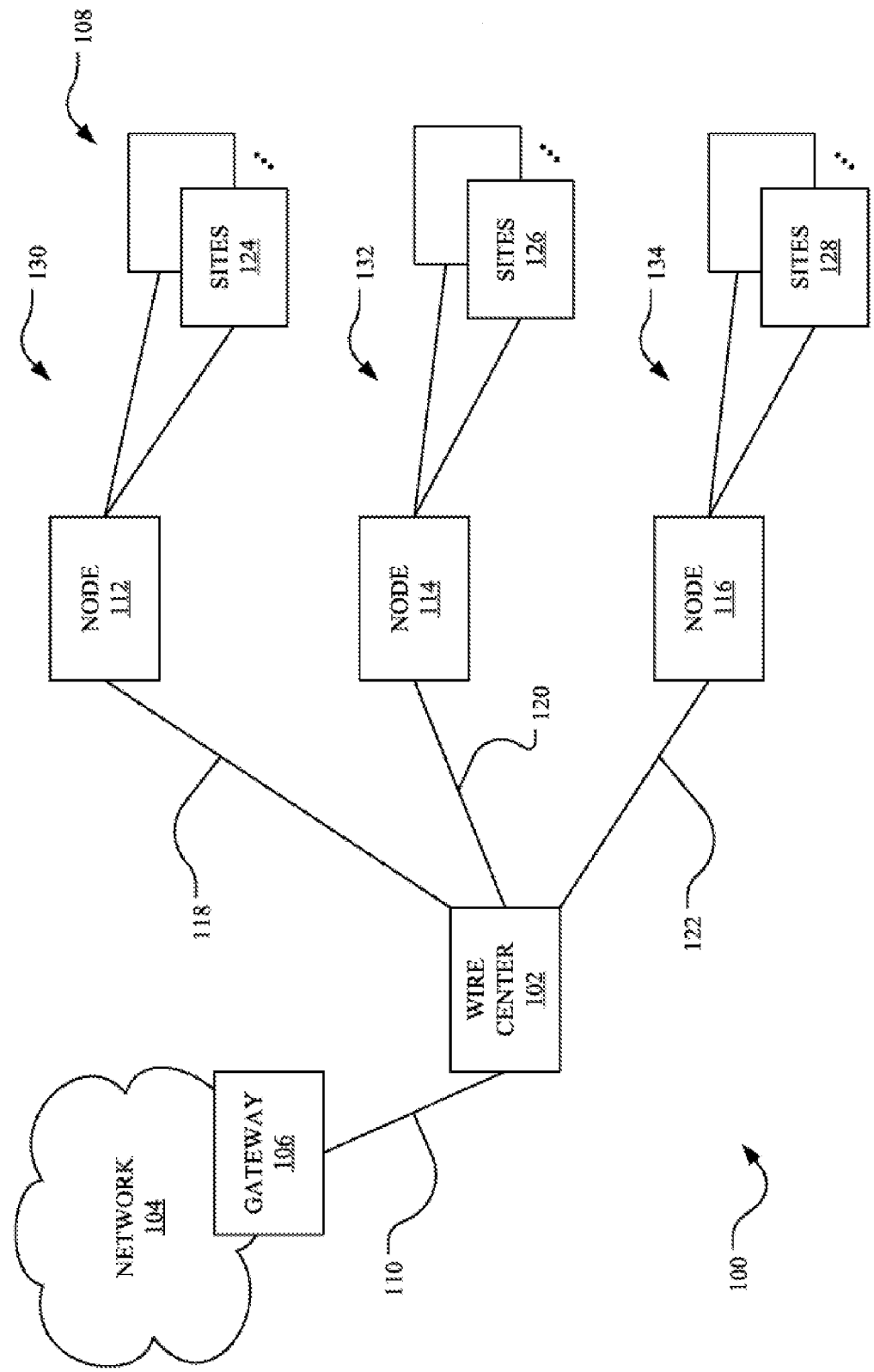
FIG. 1 is a block diagram showing an example network environment with one or more communications nodes each having a node type determined based on a simulation of customer events over time.

To begin a detailed description of an example network environment 100, reference is made to FIG. 1. In one implementation, the network environment 100 includes one or more wire centers 102. A network will include wire centers dispersed in the geographical regions serviced by the network. Each of the wire centers 102 is part of a network 104 comprising numerous network components for communicating data across the network 104 and to provide telecommunication services, such as broadband or other Internet services, to end users 108, such as existing or potential customers. The network 104 may be managed by or otherwise associated with a telecommunications provider, such as a large Internet Service Provider (ISP), that facilitates communication and exchanges network traffic to provide the telecommunication services. For example, the network 104 may be a large network with a backbone stretching over a large geographical region, such as the United States. The network 104 may be in communication with various other networks that provide access to the network 104 to the end users 108 for receiving telecommunications services. In one implementation, the wire center(s) 102 are in communication with the network 104 via a gateway 106. The wire center(s) 102 may be connected to the gateway 106 with a high-bandwidth fiber 130.

Generally, each of the wire centers 102 includes central office switches providing connection to the network 104 and deploying network components enabling telecommunications services for the end user 108. In one implementation, one or more communications nodes, such as cross connects or other network connection devices, communicate data between the wire center 102 and one or more sites associated with the end users 108 via one or more trunks, fibers, and/or other transmission channels between points. Each of the sites may involve a connection with a physical building, such as a business or residence, associated with one or more of the end users 108. For example, the site may be a living unit that is a single family home or a living unit that is part of a multiple dwelling unit, such as an apartment complex. A site may further be a business unit that is a single commercial unit or part of a multiple unit commercial complex. For simplicity, FIG. 1 depicts "sites" but, as noted, the sites may be associated with a residence, commercial complex, and any other location where a network connection is provided. Thus, a site generally refers to that where service exists or potentially can be deployed.

One or more of the communications nodes has a node type determined based on a simulation of customer events for that node over time, as described in more detail herein. The node type may be central office fed internet protocol (CoIP), Fiber to the Node (FFTN), Fiber to the Premises (FTTP) (also referred to as Fiber to the House (FTTH)), and/or the like. In the illustrative, non-limiting example shown in FIG. 1, a node 112 has a node type of CoIP, a node 114 has a node type of FTTN, and a node 116 has a node type of FTTP. In this example, the node 112 is connected to the wire center 102 via a copper trunk 138 and connected to one or more sites 124 with a copper twisted pair 130 to provide Direct to Subscriber Line (DSL) services. The node 114 is connected to the wire center 102 with fiber 120 and connected to one or more sites 126 with a copper twisted pair 132 to provide DSL services. Finally, the node 116 is connected to the wire center 102 with fiber 122 and to one or more sites 128 with fiber 134 in GPON architecture.

There are benefits and drawbacks to each of these node types. The CoIP node type of the node 112 and the FTTN node type of the node 114 each involve the copper twisted pairs 130 and 132, with each channel of the pairs 130 and 132 communicating in opposite directions between the nodes 112/114 and each of the sites 124/126, respectively. In these cases, the node 112/114 includes a box housing the connection to the wire center 102 and the pair of connections for each site. The FTTN node type of the node 114 deploys the DSL equipment closer in physical proximity to the sites 126 than the CoIP node type of the node 112, reducing signal attenuation and increasing internet speed. To facilitate the closer proximity, however, a power pedestal and equipment cabinet are deployed at the node 114, increasing operational costs.

On the other hand, the FTTP node type of the node 116 eliminates the need for the power pedestal and equipment cabinet. The GPON architecture involved with the node 116 utilizes one fiber 122 providing two way communication between the sites 128 and the wire center 102. Generally, the bandwidth for the fiber 122 is high enough that it replaces the individual wires of other node types that are deployed to each site. As such, the GPON architecture utilizes a passive optical splitter to connect the various sites 128 with the fiber 122 at the node 116. The splitter may be deployed in close proximity to the sites 128, providing increased symmetrical internet speed. The GPON architecture generally involves reduced operational and maintenance costs. By removing the power pedestal and equipment cabinet, the physical space of the node 116 and associated costs are each significantly reduced. Further, with the fiber 122 and/or fiber 134 being optical, damage from moisture or other environmental concerns that plague copper wires is reduced, thereby lowering maintenance costs and repair rate. The cost to change the node type from one of the others to the FTTP node type, however, may be significant, as it generally involves physically removing the copper wire and replacing it with fiber, removing the power pedestal and electronics cabinet, deploying the splitter, and connecting the sites, among other activities and costs.

As such, each of the various node types is associated with a different customer experience, customer cost, and maintenance cost, among other differences for which the end users 108 may have disparate preferences. Further, determining if, when, and what change to make to a node type generally involves a significant investment of resources over a long period of time. To balance these disparate preferences along with resource investment for the network environment 100, the myriad of communications nodes in the network environment 100 each has a node type determined based on a simulation of customer events for that node over time. Accordingly, the network environment 100 is improved by the presently disclosed technology through the deployment of one or more communications nodes selected based on a simulation of events unique to each node over time. The presently disclosed technology thus customizes the network environment 100 for optimized provision of telecommunication services for both the customer population as a whole, as well as subsets of this population. As such, the presently disclosed technology provides a technical solution for addressing the technical problem of whether to change a node type for one or more of a multitude of communications nodes in the network environment 100, when to perform the change, and what node type to select for the change. Indeed, the presently disclosed technology deploys one or more communications nodes in the network environment 100 that are each customized for a particular population within the context of the network environment 100 as a whole and accordingly conserves and intelligently allocates resources for enhancing the network environment 100 through intelligent upgrading of communication nodes, among other advantages.

In some cases, however, modeling of a communications node may provide an incomplete representation of an investment scenario for upgrading or otherwise modifying network architecture within the network environment 100. More particularly, a communications node or set of communications nodes may involve one or more disparate groups, each representing distinct demographics or network characteristics, such that modeling an impact of customer events for a communications node provides an incomplete assessment of whether to alter the network configuration of the network environment 100. For example, some areas connected to a communication node may utilize aerial cable, while others utilize buried cable, which costs significantly more to upgrade or modify. Stated differently, within a communication node a first percentage of sites may involve aerial connections, while a second percentage may involve buried connections. Upgrade or modification of aerial connections is a fraction of the cost and typically generates faster returns on investment. If the analysis of whether to upgrade or modify the network environment 100 were constrained to the communications node alone, then lower paybacks on the second percentage of sites involving the buried connection would have to be accepted in connection with an upgrade or modification to the communications node, which may make the overall investment scenario appear less optimal. Similarly, customer demographics, including income level and ownership status (i.e., whether a site is rented or owned), may generate distinct investment scenarios for upgrade or modification of the network environment 100. Accordingly, the presently disclosed technology generates one or more investment clusters for analysis within a contiguous buildable area of the network environment 100 according to customer and/or network characteristics.

A GPON overbuild for one or more aspects of the network environment 100 further provides unique investment considerations. More particularly, GPON overbuild involves running fiber-optic cable from the wire center 102 to each site (e.g., the sites 128 via the node 116), which does not necessarily have to follow existing cabling routes and coverage areas. Stated differently, the build area for the GPON overbuild does not need to align with the existing node coverage areas because nothing from the existing copper network architecture can be reused. A telecommunications build involving GPON architecture may be Brownfield and/or Greenfield builds. Brownfield builds involve an upgrade to sites currently served by legacy technology, such as CO-IP or FTTN, and Greenfield builds involve a build service to new sites that are proposed but not yet built.

In each case, various GPON overbuild considerations are taken into account. For example, in the wire center 102, optical line terminal (OLT) equipment is deployed, which sends data to and receives data from customer units using GPON specific optical standards. Bundles of fiber-optic cables from the OLT rack to a series of fiber service area interfaces (FSAI) located at various locations within a proposed service area of the network environment 100. Cables from each OLT port are routed to a FSAI, which passively splits the fiber optic cable. The split fiber optics cables can then run to an endpoint or a further downstream splitter. Cables from the FSAI to each site are terminated at an optical network terminal (ONT), which converts the optical signal into ethernet packet traffic. Costs per foot of both fiber optic cable and cable routing efforts (e.g. boring, trenching) are high, so identifying areas for GPON overbuild and optimizing buildout plans for those areas is important. As such, one or more investment clusters are identified for determining optimal areas for GPON overbuild through simulation of customer events over time and generation of a model of an impact of the customer events.

Figure 2:
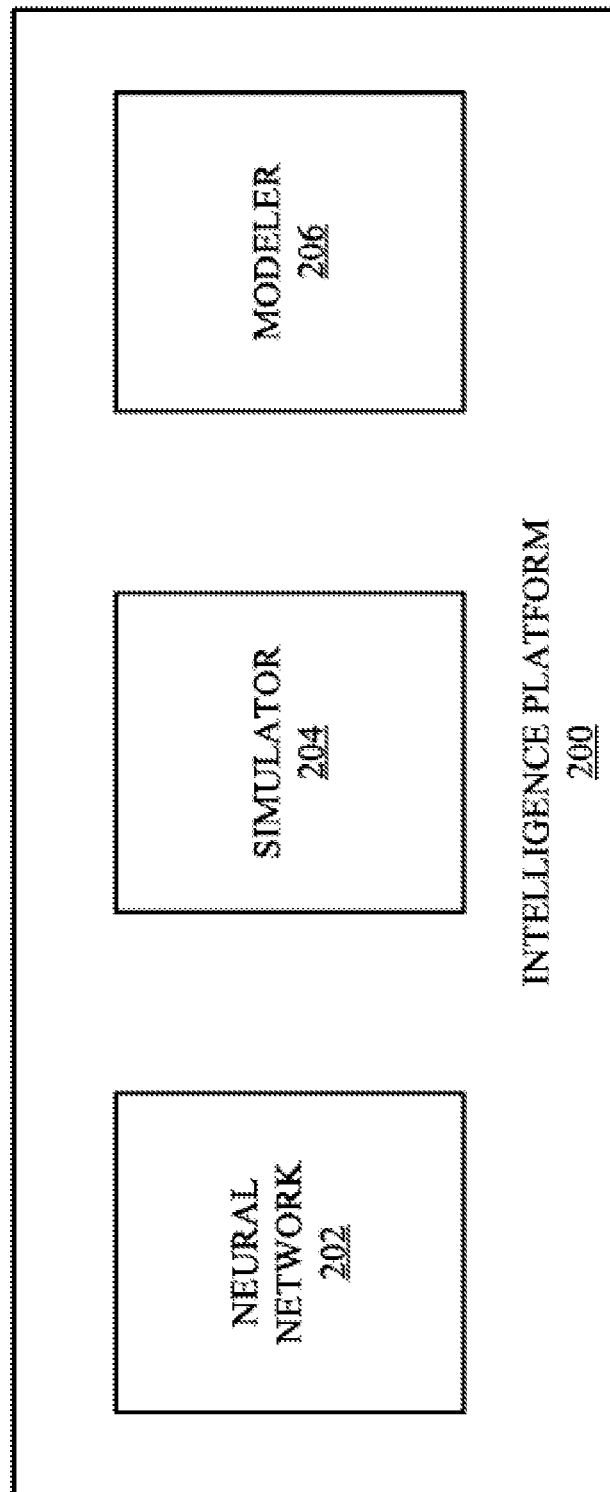
FIG. 2 is a block diagram showing an example artificial intelligence platform simulating customer events over time for a node in a communications network and generating a model of an impact of the customer events.

For a detailed description of an example artificial intelligence platform 200 simulating customer events over time for a node, a site, or an investment cluster within the network environment 100 and generating a model of an impact of the customer events, reference is made to FIG. 2. In one implementation, the artificial intelligence platform 200 includes a neural network 202, a simulator 204, and a modeler 206. The artificial intelligence platform 200 may be deployed in a data center of the network 104, elsewhere in the network environment 100, or may be in operable communication with the network environment. While FIGS. 2-5 are described with respect to a communications node, it will be appreciated that the presently disclosed technology may be applied at the investment cluster level, site level, or other network level for generating an associated model of an impact of customer events.

Generally, the artificial intelligence platform 200 analyzes each communications node in the network environment 100 to determine whether to change a particular communications node from a first node type to a second type in real time as conditions within the network environment 100 change. In one implementation, the artificial intelligence platform 200 generates a list of each communications node ranked according to a priority for changing the node type. As conditions within and surrounding the network environment 100 change and/or more detailed input data becomes available, the artificial intelligence platform 200 may generate one or more subsequent lists in real time, and if a communications node remains high on the priority list as additional rankings are generated, resources may be allocated to change the node type accordingly.

For example, the input data, including, without limitation, a customer population count, a number of sites, revenue associated with the customer population, and the like, may be updated at a regular time interval, such as each month. The artificial intelligence platform 200 may digest such input data and at the regular time intervals, alone or in combination with dynamic simulation inputs, output a model of resource allocation for changing a node type for a particular communications node based on a simulation of customer events over time. Using the model, a priority for changing the node type of the communications node is ranked among priorities for a plurality of other communications nodes. Based on the priority, additional input data, captured through a physical survey by personnel for example, may be used to refine the simulation and generate a subsequent priority list. By consistently running the simulations in real time as updated input data is obtained, the artificial intelligence platform 200 provides a list of top communications nodes that would have the largest impact on optimizing the network for enhanced customer experience and resource allocation. This impact, for example, may indicate a priority list for upgrading communications nodes in the network that will have the greatest return on investment.

In one implementation, the neural network 202 obtains input data that may change over time or involve subjective aspects, recognizes patterns in the input data, and interprets the patterns through machine perception, labeling, clustering raw input, and/or other clustering, classification, and correlating mechanisms. Through the interpretation of these patterns, the neural network 202 generates dynamic simulation inputs for the communications node to identify one or more customer populations with an increased expected penetration, thereby micro-targeting specific customer populations and associated communications nodes that have an increased probability of being a priority for changing the node type.

The dynamic simulation inputs may include, without limitation, customer demographics, competitor information, regional information, and/or the like. The customer demographics may include various information about the makeup, behavior, and preferences of the customer population, such as likeliness to subscribe to the telecommunication services, price sensitivity, emphasis on certain features (e.g., weighing price versus internet speed), the type telecommunication services desired and at what level, and/or the like. For example, the neural network 202 may generate customer demographics specifying that the customer population desires high speed internet and weighs price and internet speed, such that a medium speed service is desired that may not include the fastest speed or best service but provides a quality service at a reduced price. Similarly, the competitor information may include data regarding how many competitors exist in the geographic region associated with the customer population, services offered by those competitors that are in direct competition with the services provided by the network provider, likelihood that the customers will select the network provider over a competitor, and/or the like. Finally, the regional information may include other changing or subjective information unique to the customer population or the network capabilities in the geographic region that may impact the customer population for a particular communications node. For example, the topology of the geographic region for the communications node may be such that certain node types are impractical to deploy regardless of other factors. As such, the neural network 202 generates customer population statistics, such as a new sales rate, in the form of an expected penetration for a customer population associated with a selected communications node.

The simulator 204 translates a set of expected probabilities in the form of simulation parameters into a discrete simulation. The simulation parameters may include, without limitation, service survival rates, gross sales rates, speed migration rates, and/or the like. In one implementation, the simulator 204 receives a selection of a communications node and obtains a current customer state for the communications node. The current customer state may include a current customer list, including, but not limited to, a location, a list of subscribed services, service level (e.g., internet speed), and a monthly billing rate for each customer. The current customer state may further include a new customer set generated based on a new sales rate and an offer distribution. In one implementation, the new sales rate is generated by the neural network 202 based on the dynamic simulation inputs for the communications node. In some implementations, the new sales rate may be limited to modeled sites without an active customer such that there cannot be more customers than sites. The current customer state is loaded into the simulator 204 as a customer set at a starting point (e.g., month 0). The simulator 204 simulates the customer set over time as a discrete event simulation for a node type and outputs customer events. The customer events indicate how the customer population for the communications node changes over time. For example, over time, customers may disconnect from service, subscribe to service, upgrade service, downgrade service, and/or the like. The simulator 204 outputs customer events, including a customer count and revenue curve, which may be aggregated by speed or otherwise by node type, bill rate, month, and/or the like.

In one implementation, the modeler 206 generates a model of an impact of the customer events. The impact may include performance analytics for the communications node for the node type. The performance analytics for each node type may be compared to determine whether to modify the node type for the communications node. More particularly, the simulator 204 and the modeler 206 may be run for each selected node type for aggregation and comparison. In one implementation, a particular node type that may be representative of an upgrade scenario, downgrade scenario, or no change scenario is selected, and the simulator 204 simulates customer events over time for the particular node type. The output of the simulation for the particular node type may then be compared to the output of the simulation of another node type with performance analytics for each simulation output generated by the modeler 206 for comparison. In one implementation, the modeler 206 generates cash flows for the communications node according to the node type based on the customer counts, associated revenue, and consumer costs. Stated differently, the modeler 206 outputs performance analytics, including a financial impact in the form of profit, for each simulation of a different node type, and the modeler 206 generates a comparison of the performance analytics for each node type. The comparison may be in the form of a priority list sorting the communications nodes according to one or more performance parameters. In one implementation, additional data for each of the communications nodes in the priority list is gathered and input into the simulator 204 to rerun the simulation of the node type and obtain a verified simulation output. If the verified simulation output remains in the priority list, the communications node may be changed to the simulated node type. The artificial intelligence platform 200 thus predicts a customer count, revenue, and customer events (e.g., installs, disconnects, upgrades, downgrades, etc.) over time at a given communications node, from which an accurate financial assessment of a potential node type change is generated.

Figure 3:
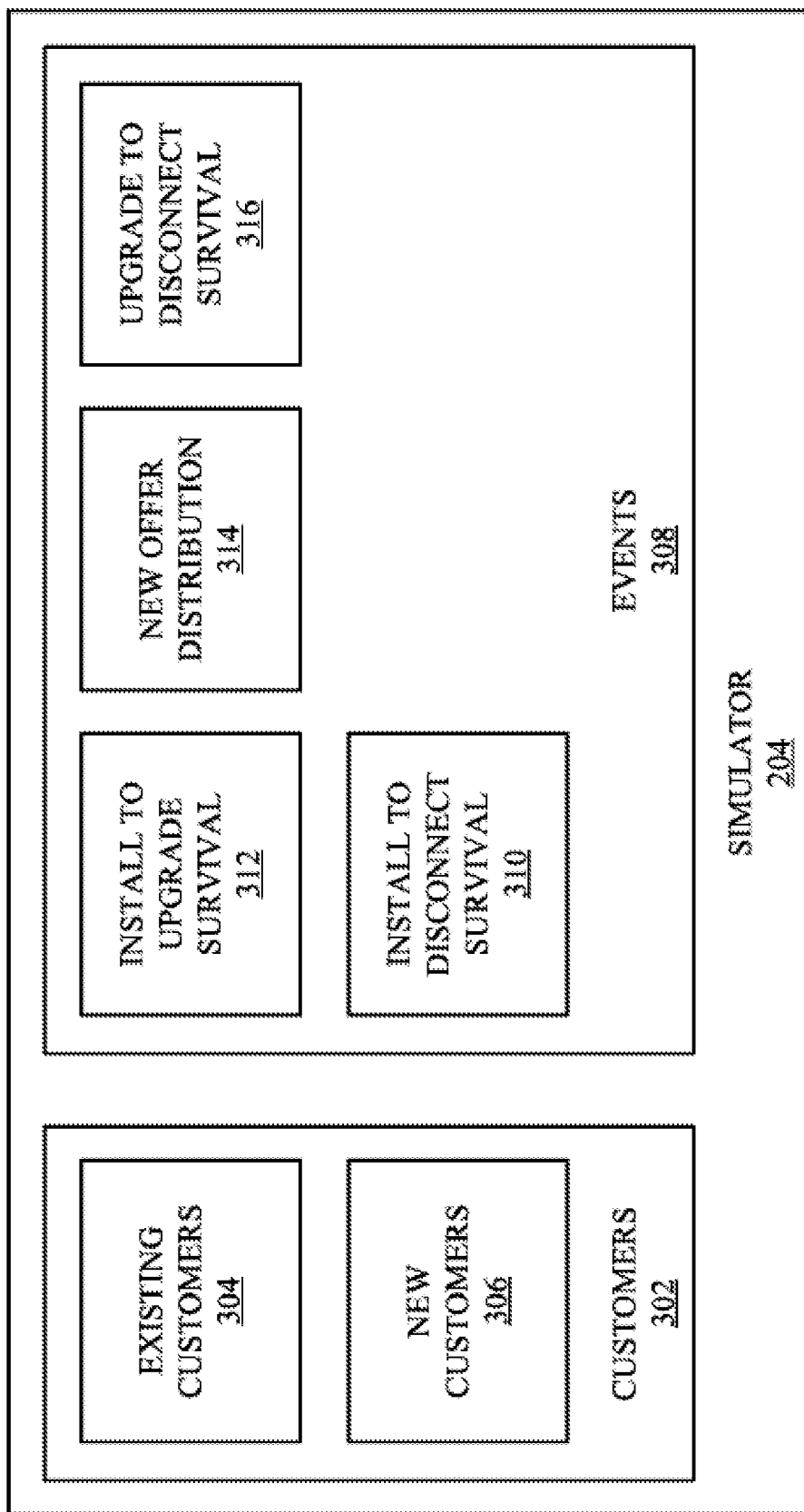
FIG. 3 is a block diagram showing an example simulator.

Turning to FIG. 3, a block diagram showing an example of the simulator 204 is shown. In one implementation, the simulator 204 is implemented in golang as a discrete event simulation. It will be appreciated that the simulator 204 may be implemented in various programing languages and within other simulation environments. The simulator 204 runs a simulation of a node type for a particular communications node in real time. Similarly, the simulator 204 may run a simulation of a GPON overbuild investment for one or more investment clusters. However, while the presently disclosed technology may perform a simulation at the investment cluster level, site level, or other network level using the simulator 204, for illustrative purposes the simulator 204 is described herein at the communications node level. In one implementation, the simulator 204 runs a simulation in approximately eight milliseconds, such that simulations for various node types for the myriad of communications nodes in a network may be run quickly.

In one implementation, the simulator 204 obtains a customer set 302 for a selected communications node. The customer set 302 may include existing customers 304 extracted for the selected communications node with internet speed, price, install date, and/or other input information. The customer set 302 may further include new customers 306 generated based on a new sales rate and offer distribution. In one implementation, the neural network 202 generates the new sales rate as a percentage of a customer population that subscribes to services. As noted above, the new sales rate may be limited to sites with no active customers to limit the number of customers to less than the number of sites. The new sales rate may be expressed in a continuous domain exponentially distributed random variable providing a population statistic of a number of sales per month that may be applied to a sub-population of living units associated with the communications node. The offer distribution provides a speed and price point of a sale by node type run against the living units of the customer population. The offer distribution assumes all offer types for services with a probability adding to one, so the offer distribution may be a uniformly distributed random variable. Thus, the new sales rate provides a time of a next sale identified from the exponential distributed random variable through discrete event simulation and the offer distribution identifies what services are involved with the next sale. Generally, the customer set 302 may be generated by the neural network 202 based on the dynamic simulation inputs and/or from an empirical sample of the customer population.

Using the customer set 302, the simulator 204 simulates customer events as a discrete event simulation through survival functions over time. The survival functions may be based upon the empirical assumption that approximately 98% of customers of a network follow the same permutations of events. In particular, customers either: install a service, upgrade the service, and then disconnect the service; or install the service and then disconnect the service. Thus, in one implementation, the survival functions include an install to disconnect survival function 310 and an install to upgrade survival function 312. The install to disconnect survival function 310 represents a customer that installs a service followed by the next event being the customer disconnecting the service and is generated based on service type and internet speed. The install to upgrade survival function 312 represents a customer that installs a service followed by the next event being the customer upgrading the service and is generated based on new sale service type and internet speed. Because the upgrade changes the service type, a new offer distribution 314 by speed and price point for each service type is utilized to determine what the customer upgrades to. Following the upgrade, an upgrade to disconnect survival function 316 represents the next event following the upgrade being the customer disconnecting the service and is generated based on an upgraded service type and internet speed.

As such, the survival functions 310, 312, and 316 predict how long it will take for each of these events to occur. Over a long enough time, each of the customers in the customer population will disconnect with a mean survival of the portion of the customer population that has upgraded service being longer than the portion of the customer population that has not upgraded. In one implementation, the survival functions 310, 312, and 316 are generated based on a Kaplan-Meier estimator survival analysis by service type and internet speed. However, other survival functions, such as proportional hazard models, and/or the like may be utilized.

In one implementation, each of the survival functions 310, 312, and 316 are output as an interactive survival curve having a movable point that may be dragged along the survival curve to display a speed bucket of the different node types and/or service types for a communication node with survival probability at each month. For example, the install to upgrade survival function 312 may be depicted as a survival curve showing a probability that a customer lasts until a given month without upgrading. Customers who ultimately disconnect may be included in the install to upgrade survival function 312 until the point of disconnection, at which time the customer drops from the survival curve. For both the install to disconnect survival function 310 and the upgrade to disconnect survival function 316, the survival curves may show a probability that a customer lasts until a given month without disconnecting.

In one implementation, the survival curves are based on empirical data where they will each approach one point at which there is an insufficient sample size to continue to generate the survival curves based on empirical data. At that point, the various survival functions 310, 312, and 316 may be generated according to an exponential survival function, which assumes a constant death rate where over time customers will disconnect causing a number of the surviving population to decrease but that at any remaining time slice, the probability of disconnecting remains the same. The exponential survival function may be expressed as: $e^{-\lambda t}$, where $\lambda$ is the rate and t is time.

The simulator 204 simulates the customer set 302 over time for a selected node type for the communications node as a discrete event simulation and outputs customer events 308 according to the new customers 306 and the survival functions 310, 312, and 316. Thus, the simulator 204 generally simulates customers and revenue for a selected node type for a given communications node. The simulation 204 models the customer set 302 for the node type over time, where an event 308 is simulated for each customer as a for loop discrete event simulation.

More particularly, in one implementation, the simulator 204 determines whether the next event is going to be an event with an existing customer 304 or an event with a new customer 306. The existing customers 304 are sorted into a list according to the next event for each customer, such that the customer at a top of the sorted list of the existing customers 306 is the customer for whom the next event 308 will occur first. In one implementation, a simulation time from time 0 to time t (in months) is set for the simulator 204. Taking the first customer from the sorted list of the existing customers 304, a randomly generated number is utilized in the install to upgrade survival function 312 and the install to disconnect survival function 310 to determine whether an upgrade event occurs first or a disconnect event occurs first for the first customer of the existing customers 304 during time t. If the upgrade event occurs first, the customer event 308 for the first customer is an upgrade event, and if the disconnect event occurs first, the customer event 308 for the first customer is a disconnect event.

As described above, the new sales rate for obtaining the new customers 306 may be expressed as an exponentially distributed random variable to determine a time of a next sale event for a given site. As such, if the time to whichever of the upgrade event or disconnect event occurred earlier is less than or equal to the next sale event for a new customer 306, then the next event 308 will be the upgrade/disconnect event for the first customer of the existing customers 304. On the other hand, if the time to the upgrade or disconnect event for the first customer of the existing customers 304 is less than the next sale event for a new customer 306, then the next event is an install event occurring at the time of the next sales event.

After it is determined whether the next event is with the existing customers 304 or the new customers 306, the customer is appended to the events 308 and resorted within the customer set 302. More particularly, in one implementation, if the next event was an install with a new customer 306, the new customer 306 is added to the existing customers 306, and the existing customers 306 is resorted to position the next customer that will have an event at the top. If the next event was a disconnect with the first customer at the top of the list of the existing customers 306, then the first customer is removed from the existing customers 306. If the next event was an upgrade event with the first customer at the top of the list of the existing customers 306, then the new offer distribution 314 determines the new internet speed and price point by the service type for the first customer, and this information is appended to the first customer. The first customer is then resorted within the existing customers 306 where the next event for this customer will be a disconnect with timing dictated with the upgrade to disconnect survival function 316. As such, this customer will be further down the sorted list of the existing customers 306 for the next events.

The simulator 204 will continue to run the simulation of the customer set 302 until the time t elapses, at which time the simulator 204 outputs the customer events for the selected node type of the particular communications node over time t. In one implementation, the customer events include a customer count aggregated by event type and a revenue curve. The customer count may include the number of customers at the end of the simulation that had an install event, an upgrade event, and a disconnect event, as well as the total number of customers remaining. These values may be expressed as an install count, an upgrade count, a disconnect count, and a customers end count. The revenue curve may include a total revenue, an install revenue, a customers end revenue, a downgrade revenue, an upgrade revenue, and a disconnect revenue.

The simulator 204 may generate a graphical user interface for presenting the output of the simulation including the customer events on a presentation system, such as a display. In one implementation, the simulation output includes a simulation identification, a snapshot date, a wire center identification, a node identification, and a site count. The simulation identification may be used to locate and retrieve simulations stored in one or more databases, compare a plurality of simulations for a communications node (e.g., compare simulations for different node types), and/or the like. The snapshot date reflects the date from which the information utilized to build the existing customers 304 was obtained. The wire center and node identifications identify the particular wire center and communications node being simulated, and the site count identifies the number of sites associated with the communications node.

The simulation output may further present the simulation parameters involved in generating the simulation, including, but not limited to, a seed number, a replication count, a new sales service type, the new sales rate, simulation months in time t, and simulation time. The seed number is a an input to a pseudo random number generator that allows the same results to occur if the same seed number is used. In cases of higher variability, a higher replication count may be used. The seed number may be used in connection with replication. More particularly, the simulator 204 may run the simulations a predetermined number of times (e.g., 10) with different seed numbers. The simulator 204 averages the output of the simulations run the predetermined number of times. As the simulator 204 is generally pseudorandom, the replication utilizing an average of simulations run with different seed numbers may prevent outliers, particularly in smaller telecommunications builds having a smaller set of sites.

The new sales service type may reflect a node type for the communications node. For example, it may be CoIP, FTTN, or FTTP, and depending on the current node type of the communications node, by selecting one of these node types, the simulation may be reflective of an upgrade scenario, a downgrade scenario, or a no change scenario. The simulations for each of these scenarios may be compared by linking the different simulations with the simulation identifications. For example, the simulations may be compared to analyze any difference in new sales rates, revenue, customer counts, and/or the like. Further, in some cases, a group of communications nodes may be simulated together for further analysis and comparison. The simulation months represents the amount of time t in months (or some other interval) over which the communications node is simulated for the customer set 302. Finally, the simulation time indicates how long it took the simulator 204 to complete the simulation. For example, the simulator 204 may complete each simulation in milliseconds.

In one implementation, the simulator 204 further simulates ports on the network to determine consuming ports on network cards and whether additional network cards are needed. Where the customer count of the consuming ports remains the same, the curve is flat, where no additional cards are needed. On the other hand, where the customer count is growing as simulated by the simulator 204, when the customer count reaches a predesignated threshold, a new card may be needed. The simulator 204 simulates these scenarios to predict when another card will be needed.

As described above, the simulator 204 outputs the customer events for the selected node type of the particular communications node over time. The customer events provide revenue information and customer counts but do not provide an impact of these customer events, including performance analytics. As such, the customer events are input into the modeler 206 to determine what an overall cost and profit will be for each node type of the communications node.

If the sales rate is too high or the survival curves are too long, the simulator 204 may produce results that are inconsistent with empirical data or management expectations. As such, the simulator 204 may be calibrated such that given the inputs of two types of offer distributions and three types of survival curves, the simulation is prevented from exceeding more customers than sites. The calibration may be generated by solving for an equilibrium penetration rate in closed form given these inputs.

In one implementation, an upgrade to disconnect mean survival of the upgrade to disconnect survival function 316 is calculated by install speed. More particularly, based on the new offer distribution 314, the upgrade to disconnect survival function 316 is probability weighted to obtain the upgrade to disconnect mean survival by the install speed. The mean times from install to upgrade and from install to disconnect are then calculated, and the upgrade to disconnect is combined with the install to upgrade time. A combined service survival is calculated from the install to upgrade time, including the upgrade to disconnect mean survival, and the install to disconnect time. The mean survival time based on install speed for the combined service survival is calculated in sigma discrete space with a continuous integral that integrates over continuous space. From the offer distribution, a probability that the customers will subscribe to each of the install speeds is known for a new sale, and a mean survival of a new sale may be calculated from these values. The mean survival of a new sale expressed in months multiplied by the new sales rate provides the equilibrium penetration rate expressed as a percentage. In one implementation the new sales rate is represented across non-active customer sites. In this implementation the assumption may be more accurately described as new sales rate per non-customer, and the formula for calculating equilibrium penetration would be given as follows:

$$\frac{NewSalesRate * MeanSurvival}{1 + NewSalesRate * MeanSurvival}.$$

The equilibrium penetration rate represents the limit that if the simulator 204 is set to run with time t at an infinitely large number of months, at the end of the simulation, the customer count will equal the equilibrium penetration rate.

Figure 4A:
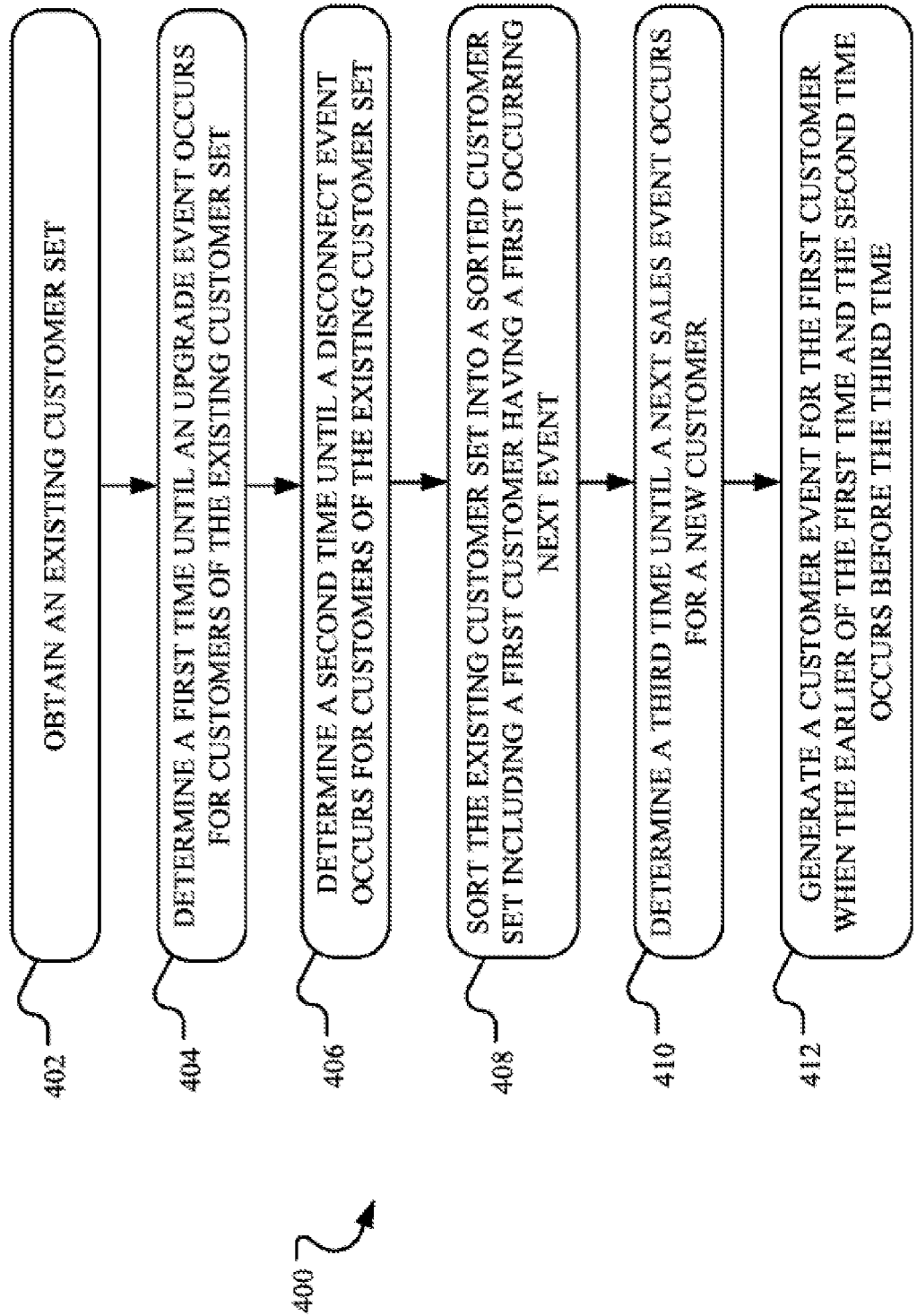
FIGS. 4A and 4B illustrate example operations for simulating a customer population for a communications node in a telecommunications network.

Referring to FIG. 4A, example operations 400 for simulating a customer population for a communications node in a telecommunications network are illustrated. In one implementation, an operation 402 obtains an existing customer set. The existing customer set includes a plurality of existing customers corresponding to a plurality of sites, such as living units, commercial units, customer units, and/or the like, connected to a wire center through a communications node having a current node type. An operation 404 determines a first time until an upgrade event occurs for the each customer of the existing customer set. In one implementation, the operation 404 utilizes an install to upgrade survival function in the form of a Kaplan-Meier estimator survival analysis by new service type and internet speed. An operation 406 determines a second time until a disconnect event occurs for each customer of the existing customer set. In one implementation, the operation 406 utilizes an install to disconnect survival function in the form of a Kaplan-Meier estimator survival analysis by service type and internet speed. An operation 408 sorts the existing customer set into a sorted customer set according to a time until a next event for each of the plurality of existing customers. The sorted customer set includes a first customer having a first occurring next event of the next events.

An operation 410 determines a third time until a next sales event occurs for a new customer. In one implementation, the operation 410 utilizes a new sales rate and offer distribution to determine the third time until the next sales event. An operation 412 generates a customer event for the first customer when the earlier of the first time and the second time occurs before the third time. The customer event is an upgrade event where the first time occurs before the second time, and the customer event is a disconnect event where the second time occurs before the first time. On the other hand, if the third time occurs before the earlier of the first time and the second time, the customer event generated is an install event for the new customer.

Figure 4B:
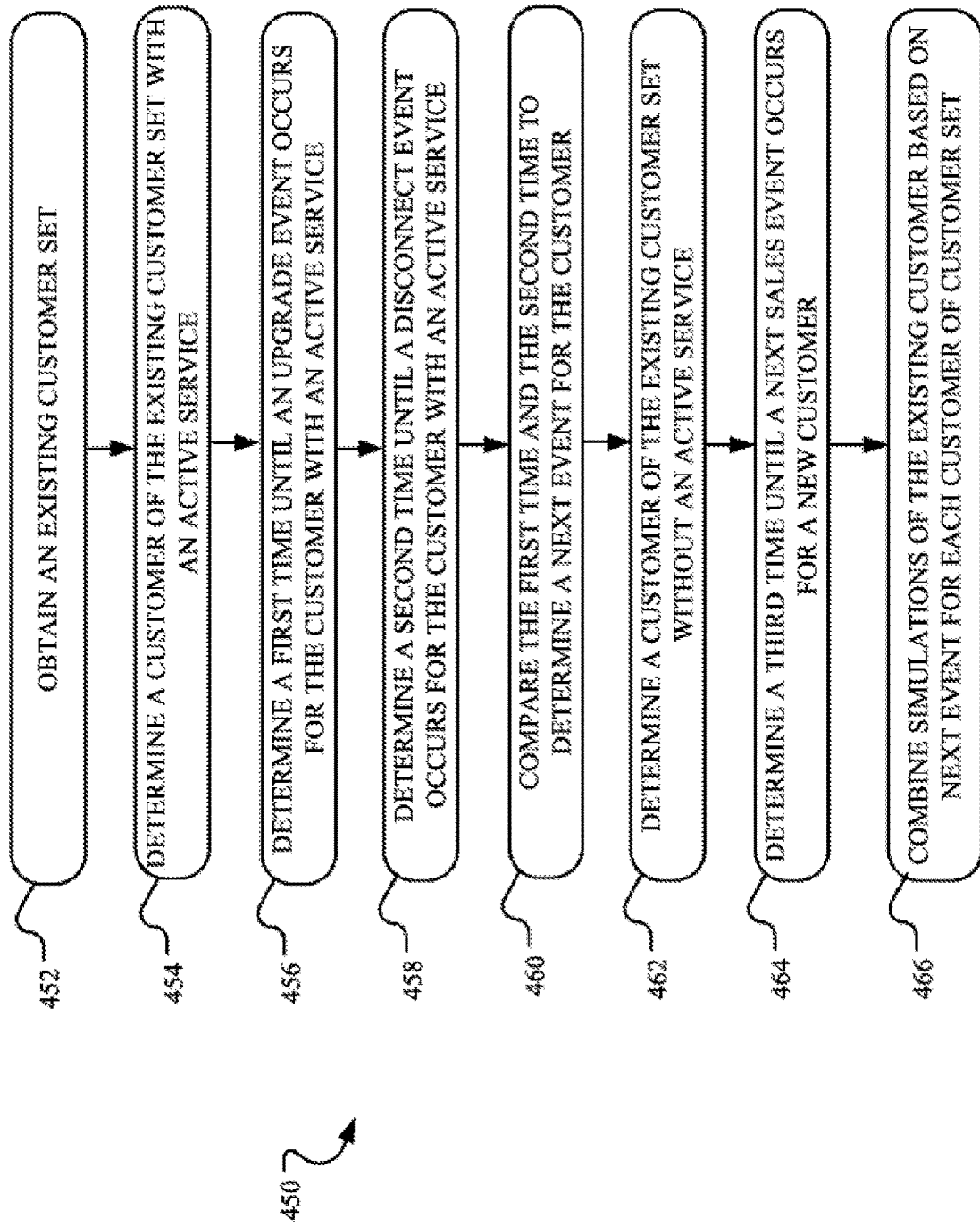

Referring to FIG. 4B, example operations 450 for an alternate method of simulating a customer population for a communications node in a telecommunications network are illustrated. In one implementation, an operation 452 obtains an existing customer set. The existing customer set includes a plurality of existing customers corresponding to a plurality of sites, such as living units, commercial units, customer units, and/or the like, connected to a wire center through a communications node having a current node type. For each existing customer in the existing customer set, a simulation is independently completed, and then the simulations may be combined to represent a fully simulated set of existing customers and new customers. Thus, an operation 454 identifies each customer of the existing customer set with an active service at the corresponding site. For customers with an active service, an operation 456 determines a first time until an upgrade event occurs and an operation 458 determines a second time until a disconnect event occurs for each customer with an active service. An operation 460 compares the two times to determine a next event and a next event time.

An operation 462 identifies, for each customer of the existing customer set, customers without an active service at the corresponding site. For customers without an active service, an operation 464 determines a time until a new sales event occurs for a new customer. An operation 466 then combines the simulations of each customer of the existing customer set based on the determined next events for each customer.

Figure 5:
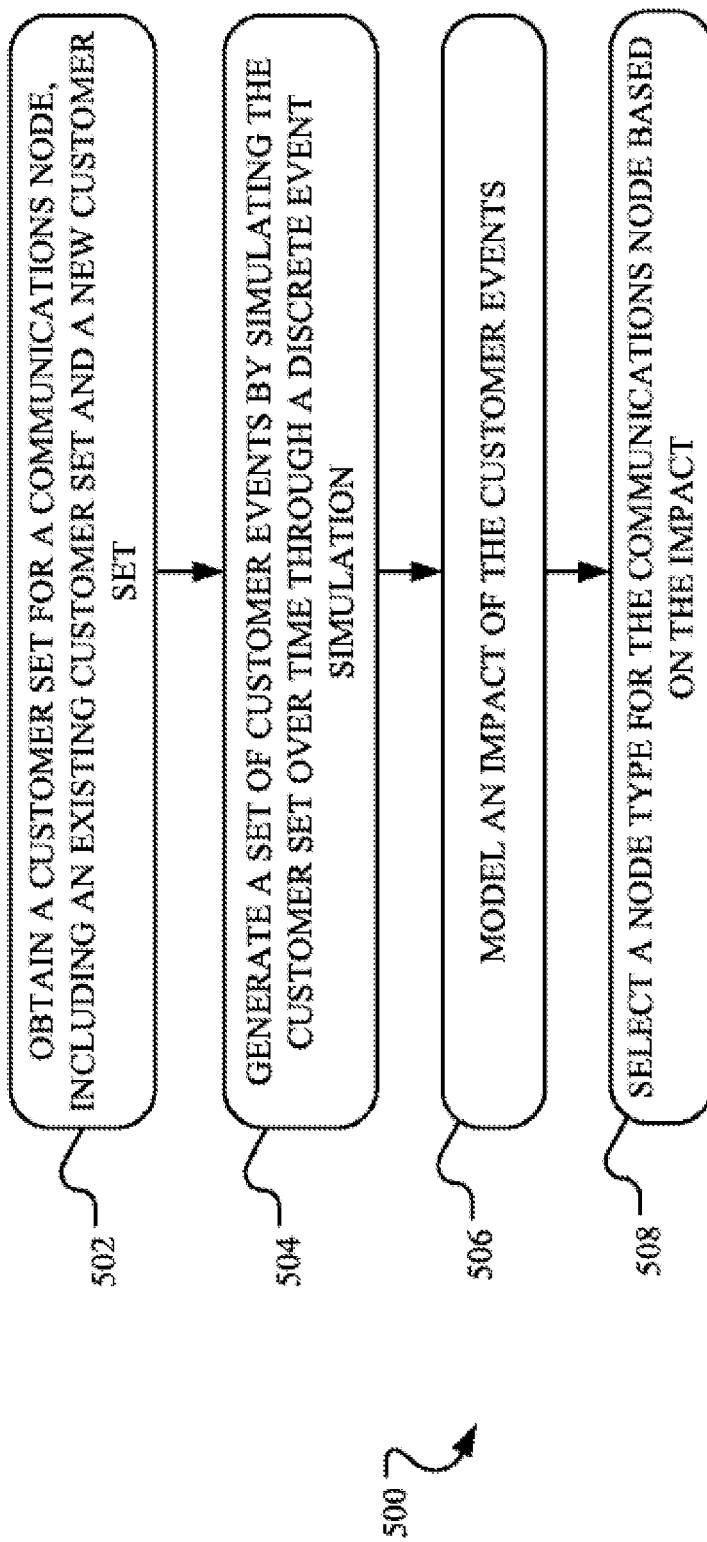
FIG. 5 illustrates example operations for selecting a node type for a communications node in a telecommunications network.

Turning to FIG. 5, example operations 500 for selecting a node type for a communications node in a telecommunications network are shown. In one implementation, an operation 502 obtains a customer set for the communications node. The customer set includes an existing customer set and a new customer set. The new customer set may be generated by a neural network using a new sales rate and offer distribution. An operation 504 generates a set of customer events for a selected node type of the communications node using a simulator by simulating the customer set over time through a discrete event simulation. The discrete event simulation may involve inputs of two types of offer distributions and three types of survival curves, such as an install to disconnect survival curve, an install to upgrade survival curve, and an upgrade to disconnect curve. The set of customer events may include customer counts for each event type, such as install events, disconnect events, upgrade events, and total customer count, as well as revenue curves for each type of event and total revenue for the selected node type. An operation 506 models an impact of the customer events for the selected node type. The impact may include performance analytics in the form of overall cost and profit for the selected node type of the communications node. An operation 508 selects the node type for the communications node based on the impact. For example, the operation 508 may selected the node type based on a comparison of the impact for the selected node type to a second impact for another node type. The node type of the communications node may then changed accordingly.

As described herein, the artificial intelligence platform 200 may analyze the network environment 100 at an investment cluster level, a communications node level, and/or a site level using the systems and methods described with respect to FIGS. 2-5. At the investment cluster level, the artificial intelligence platform 200 first generates one or more clusters within a buildable area for analysis as discrete investment scenarios. Stated differently, the artificial intelligence platform 200 clusters sites into groups for analysis to determine whether it makes sense from an investment standpoint to upgrade or modify the network technology, for example through GPON overbuild. In one implementation, the artificial intelligence platform 200 defines buildable areas, which correspond to a given network technology for deployment and the physical parameters of it, and subdivides the buildable areas into investment clusters of similar expected returns. As a result, the network environment 100 includes one or more buildable areas subdivided into investment clusters with sites corresponding to disparate customer demographics and/or network characteristics, thereby providing sets of contiguous densely dispersed sites that are buildable.

Generally, there are network constraints around how a network may be built, which may be used to simplify an otherwise complex clustering process. In terms of algorithmic complexity, clustering is typically in the n-squared space, such that as n objects, such as sites, are clustered together, the computational time for clustering is n-squared, making the computation time for clustering operations significantly high and introducing delays and challenges into the GPON overbuild analysis. However, the network constraints may be used to simplify the clustering process to a fast and computationally efficient two-step analysis involving pre-partitioning of sites into site footprints and clustering of the sites within defined buildable areas of a site footprint.

Due to network constraints, sites within one geographical region, for example State A, are prevented from being included in a site footprint with sites within another geographical region, such as State B. In one implementation, data corresponding to sites within the network is pre-partitioned into one or more site footprints based on geography. The data may be pre-partitioned based on geography at a regional level, a state level, a core based statistical area (CBSA) level, a zip code level, and/or along other population, metropolitan, and/or geographical boundaries. Alternatively or additionally, the data may be pre-partitioned into one or more site footprints based on other network characteristics (e.g., characteristics of the sites), the customer population, and/or the like.

In one implementation, data corresponding to network characteristics and customer populations of the network is obtained from various internal and external data sources and stored in one or more databases for pre-partitioning. For example, data gathered from one or more internal sources of the network environment 100 may include, without limitation, distribution point data for all existing sites and potential new build sites and account information for all present customers associated with the sites. The distribution point data may include geospatial locations of each of the sites (e.g., as latitude and longitude coordinates), administrative information for each of the sites (e.g., state, zip code, census FIPS block, etc.), current network enablement for each of the sites, unit type of each of the sites (e.g., single family, multi-dwelling, small business, multi-business complex, etc.), and/or the like. The account information may include a current service status for each of the customers, including enablement type, purchased speed, and billing rates, and/or the like.

Data gathered from one or more external sources of the network environment 100 may include, without limitation, unit-level demographics data, location details, and/or other information relevant to the sites and/or the customer population that is publicly available or available through purchase from external providers. The unit-level demographics data may include a primary occupant income level, an ownership status (i.e., whether the site is rented or owner occupied), occupant age, internet usage, education level, and/or the like. The location details may include competitor information for other broadband competitors, population density, census block IDs and geospatial shapes, and/or the like.

In one implementation, the gathered customer data provides a full market footprint of the network environment 100, and the artificial intelligence platform 200 pre-partitions the gathered data according to one or more site footprints based on characteristics of the sites, the customer population, and/or the like. The pre-partitioned data thus breaks up the full market footprint into one or more site footprints that may be further broken up into logical groupings of sites that may be analyzed as independent investment cases for modifying the network architecture, for example through GPON overbuild. Initially, the artificial intelligence platform 200 defines one or more buildable areas within one of the site footprints using the corresponding pre-partitioned data.

Figure 6:
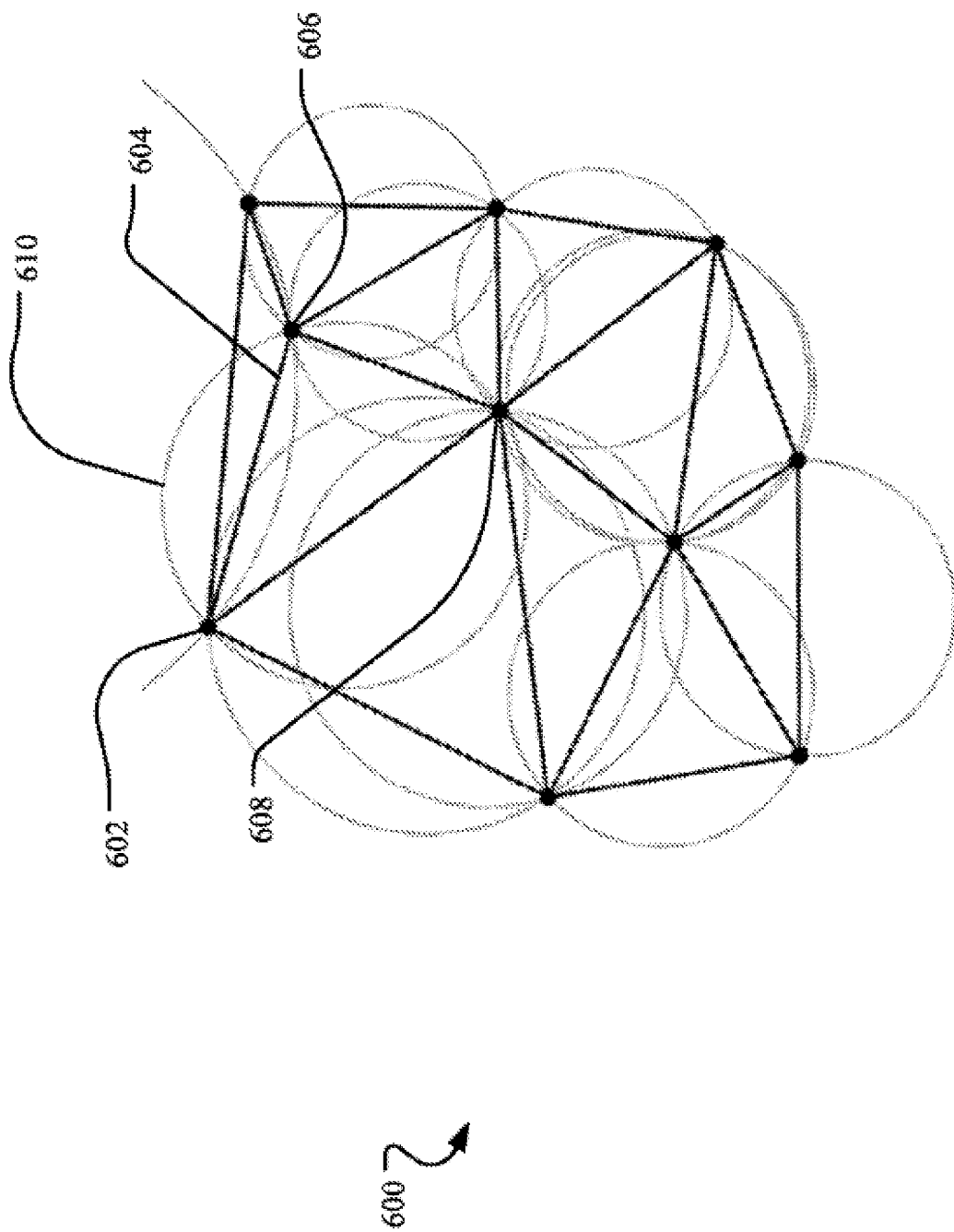
FIG. 6 illustrates an example footprint graph representing pre-partitioned sites connected through a nearest neighbor connectivity.

Turning to FIG. 6, a footprint graph 600 representing pre-partitioned sites is illustrated. In one implementation, to define each buildable area, the artificial intelligence platform 200 generates the footprint graph 600, which provides a graphical representation of the sites within a site footprint with each of the sites represented as a vertex (e.g., vertices 602, 606, and 608). The location of each vertex on the footprint graph 600 may be based on geospatial information of each sites. For example, geospatial (e.g., latitude and longitude) coordinates for each sites obtained from the pre-partitioned data may be used to define corresponding vertices in the footprint graph 600. The geospatial coordinates may represent a center of a specific parcel of a site, a network distribution point within a parcel of a site, or another location defining a site.

In defining each buildable area, nearest neighbor information for each site is generated. As shown in FIG. 6, in one implementation, the nearest neighbor information is generated through Delaunay triangulation of the vertices within the footprint graph 600. Delaunay triangulation generally involves a triangulation of a convex hull of points in a diagram in which every circumcircle of a triangle is an empty circle, such that for a given set P of discrete points in a plane is a triangulation DT(P) such that no point in P is inside the circumcircle of any triangle in DT(P). More particularly, for every three vertices in the footprint graph 600, such as vertices 602, 606, and 608, a circle 610 is drawn through them. If the circle 610 passes through the vertices 602, 606, and 608 and does not include any other vertices in the footprint graph 600 within the circle 610, the triangle formed by the vertices 602, 606, and 608 is accepted as a valid triangle with edges 604 of the triangle corresponding to connections between those vertices 602, 606, and 608. Thus, for each vertex, the corresponding vertices connected with an edge within a triangle represent a nearest neighbor, such that there is no closer neighbor to which the vertex could have an edge. The Delaunay decomposition thus outputs a list of simplices, which detail the three vertices comprising each Delaunay triangle.

In one implementation, in defining the edges between triangulated vertices, edges that connect each vertex are calculated by iterating through the simplices based on one or more edge attributes, including at least one primary attribute and/or secondary attributes. A primary attribute of an edge may be a Euclidean distance between the two vertices it connects. For example, the vertex 602 may be positioned at (0,0) and the vertex 606 may be positioned at (1,1), such that a primary attribute of the edge 604 is the Euclidean distance between (0,0) and (1,1). Secondary attributes of an edge may include one or more arbitrary attributes that may be assigned and/or customized for the site footprint. For example, the edge 604 may be defined such that both the vertices 602 and 606 are served by the same wire center, both of the vertices 602 and 606 are in the same administrative unit, the edge 604 is consistent with an average length of all edges attached to endpoint vertices in the footprint graph 600, and/or the like. As a result of the initial Delaunay triangulation, a fully connected buildable area represented as a fully connected graph 700 of a buildable area for the site footprint is generated, where every vertex 702 has a set of paths to every other vertex by traversing edges 704, as shown in FIG. 7.

Figure 7:
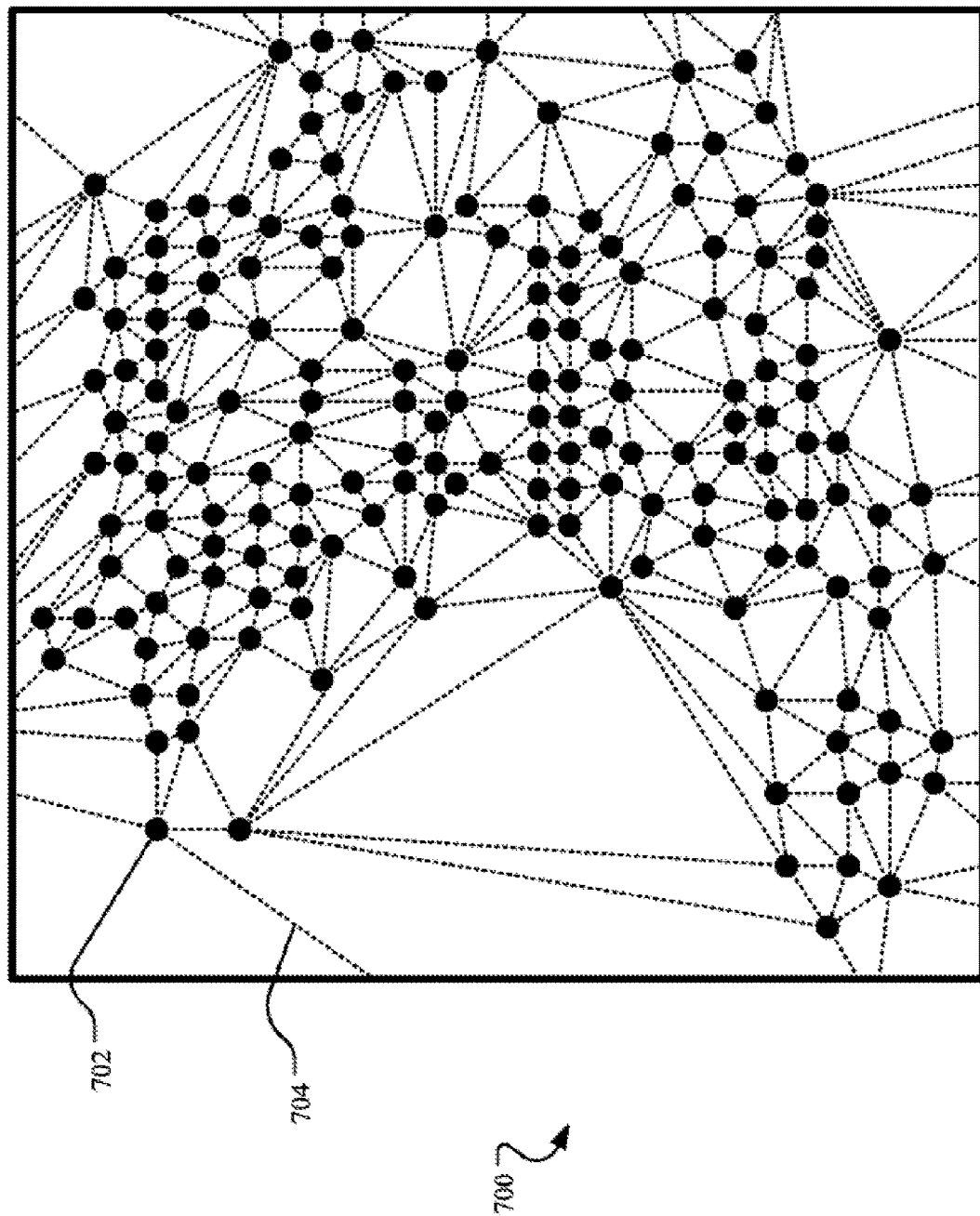
FIG. 7 shows an example fully connected graph of a buildable area for a site footprint generated based on the nearest neighbor connectivity.

As can be understood from FIG. 7, the Delaunay triangulation generates vertices 702 and the connections 704 between them to define a buildable area. Due to network constraints, each site is connected to a wire center to deliver telecommunications services to the site. The Delaunay triangulation provides an efficient approximation of how to connect all the sites within a buildable area to a wire center or other central network component. When building the network, the actual connections may vary. However, the fully connected graph 700 provides one way of connecting all the vertices 702, such that every vertex 702 is connected to its nearest neighbors with no intersections of the connections 704. As such, the fully connected graph 700 defines a buildable area with each site connected to its nearest neighbors in a nearest neighbors connectivity with a distance between each site known. It will be appreciated that the nearest neighbors connectivity of the sites may be obtained through other mechanisms in alternative or addition to Delaunay triangulation.

Figure 8:
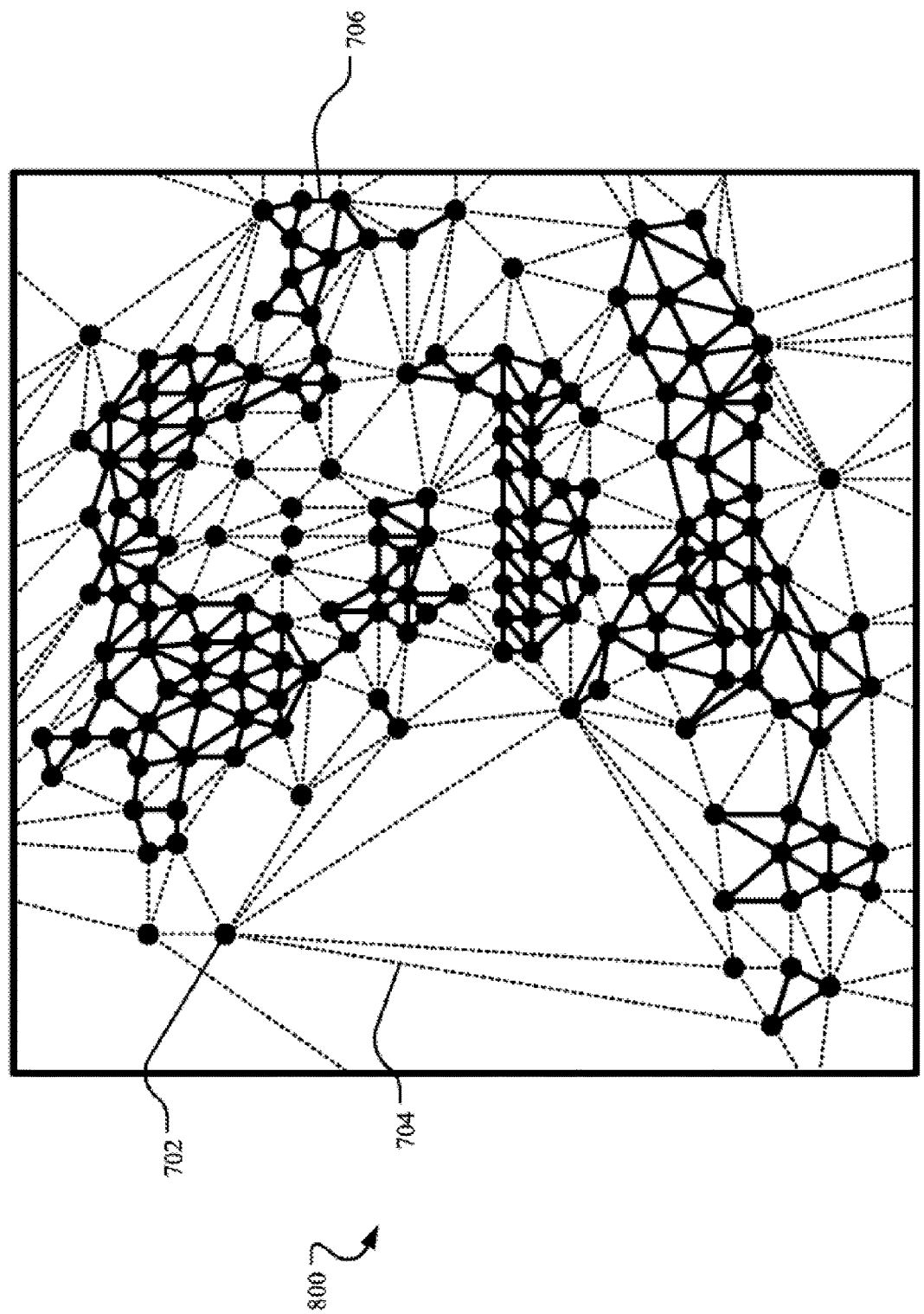
FIG. 8 depicts an example buildable area graph with buildable connections distinguished from other connections.

Turning to FIG. 8, in one implementation, the nearest neighbor connectivity of the fully connected graph 700 is a first operation of defining a buildable area. In a second operation, logic is applied to the nearest neighbor connectivity to determine which of the connections 704 are buildable connections to generate a validated buildable area. Stated differently, the nearest neighbor connectivity of the fully connected graph 700 generated through Delaunay triangulation, for example, provides a default approximation of the connectivity of every vertex 702, but some of those connections 704 may not be valid for purposes of the buildable area. For example, two vertices may be connected in the nearest neighbor connectivity, but the connection between the two sites represented by those vertices may intersect a physical feature, such as a river, or span some distance, such that it would not be economically feasible or would be otherwise economically undesirable to connect the sites. As such, the edge attributes may be aligned with various aspects of the network modification at issue, such as a GPON overbuild, that may impact expected return and/or costs.

In one implementation, one or more edge thresholds are applied to the edge attributes, such as one or more primary thresholds and/or secondary thresholds, to selectively delete connections that are not buildable or otherwise valid connections. For example, a primary threshold may be a maximum edge distance between vertices, and secondary thresholds may include arbitrary thresholds corresponding to the secondary attributes, such as both sites corresponding to the vertices being served by the same wire center, and/or the like. Stated differently, any two vertices that are separated by more than the maximum distance are not considered a buildable connection because they are too far apart to be part of a single contiguous build area.

The edge thresholds may include hard constraints and soft constraints. For example, the maximum edge distance between vertices may be a primary threshold considered a hard constraint with secondary thresholds weighting the distance between vertices as a soft constraint. More particularly, a Euclidean distance between two vertices may first be compared to the maximum edge distance, if the Euclidean distance exceeds the maximum edge distance, the corresponding connection 704 is not considered to be a buildable connection and is removed. If the Euclidean distance is below the maximum edge distance, the Euclidean distance is weighted based on any secondary thresholds. For example, if the two vertices represent sites that are not connected by the same wire center, the connection between the corresponding sites would intersect with or traverse over a physical feature, such as a river, and/or involve other assigned secondary attributes, the Euclidean distance between the two vertices may be weighted to account for those attributes. For example, not being connected by the same wire center may be weighted with a representative distance that is added to the Euclidean distance. If the sum of the Euclidean distance and the representative distance exceeds the maximum edge distance, the connection is not considered a buildable connection and is removed. If the sum remains less than the maximum edge distance, the connection remains and is considered a buildable connection.

Each of the edges 704 defined through the nearest neighbor connectivity are iterated through with any of the edges 704 that are not accepted as meeting the edge thresholds being trimmed. Thus, following the application of the edge thresholds, a buildable area graph 800 is defined with buildable connections 706 of the connections 704 distinguished from other connections. Any connections that are not buildable connections 706 are deleted. The buildable connections 706 are a subset of the nearest neighbor connectivity, representing a connectivity between vertices that follows business considerations for buildable area within the context of the network environment 100. As such, the buildable area graph 800 is no longer fully connected once edges not meeting the edge thresholds have been trimmed, such that not every vertex 702 can reach every other vertex through a path of valid edges of the buildable connections 706. As such, one or more buildable areas within the site footprint are defined. Through the trimming of edges that fail to meet the edge thresholds, the buildable are graph 800 is specifically tied to the network environment 100 and the associated network constraints. For example, a typical network constraint may be that a GPON overbuild will not include a fiber span that is longer than a specific distance, as described herein.

Within each buildable area, one or more investment clusters are generated for analysis as independent investment opportunities for network modification, for example, through GPON overlay. In one implementation, an initial clustering threshold is applied to the buildable area to distinguish buildable areas that are unlikely to be a viable investment. The initial clustering threshold may be, for example, a number of sites included within the buildable area. Thus, any buildable areas that have fewer sites that the initial clustering threshold may not be considered as a viable investment opportunity and are not further analyzed for network modification.

Figure 9:
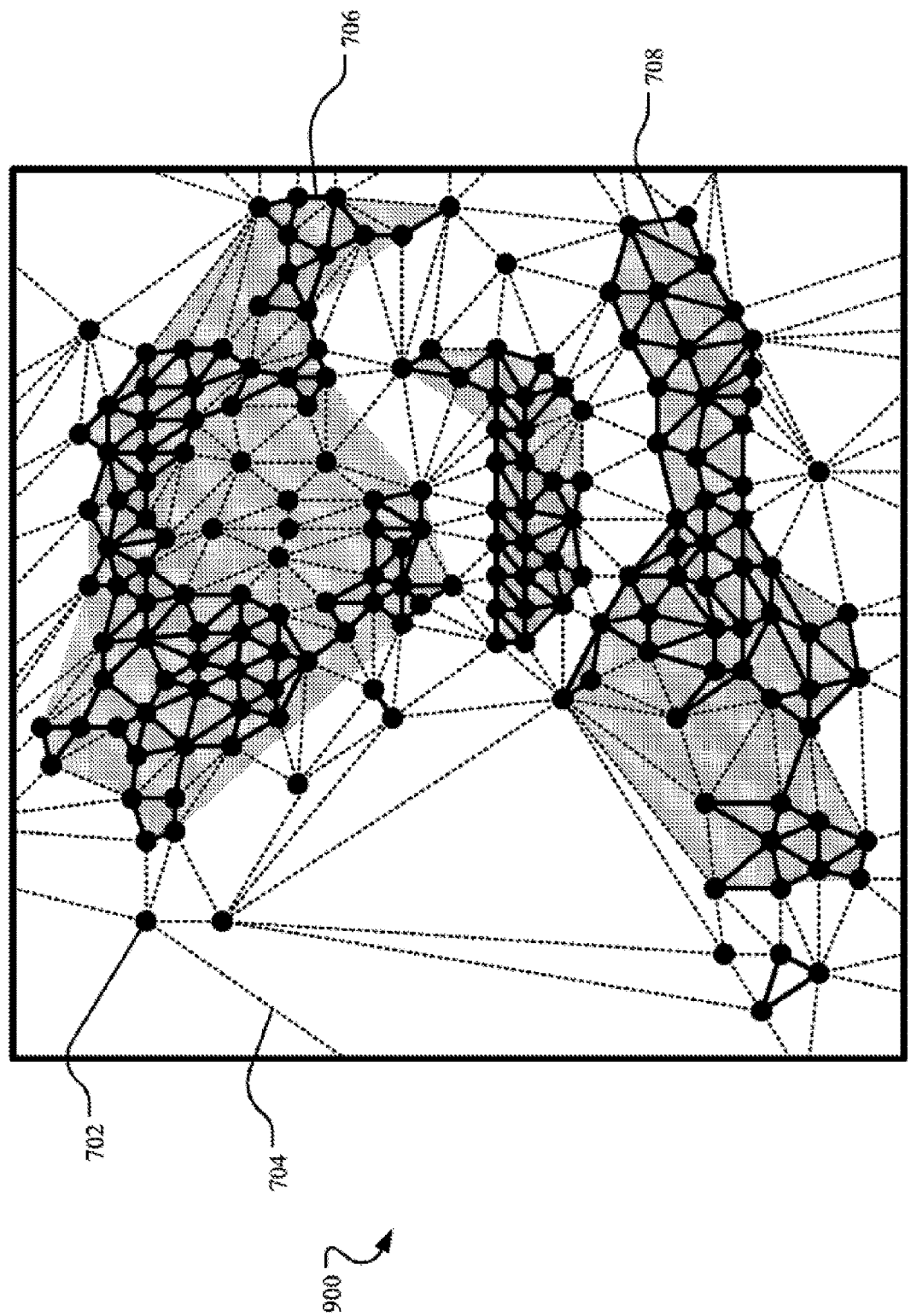
FIG. 9 shows an example connected buildable area graph with one or more disconnected subgraphs identified based on the buildable connections.

Referring to FIG. 9, a connected buildable area graph 900 is shown where the buildable area includes one or more buildable subgroups represented as disconnected subgraphs 708. Each of the disconnected subgraphs 708 is a portion of the fully connected graph 700 that remain connected internally but is disconnected from other subgraphs. Disconnected means that there is no buildable connection 706 (valid edge) that connects one of the vertices 702 in one disconnected subgraph 708 to one of the vertices 702 in another disconnected subgraph 708. As such, each of the disconnected subgraphs 708 represents a set of sites that is contiguous according to logic that is relevant to the network architecture of the network environment 100 and network modification considerations, such as GPON build considerations.

More particularly, the fully connected graph 700 is a fully connected graphical object with each of the vertices 702 connected to nearest neighbors with the edges 704. The buildable area graph 800 is obtained by selectively removing or otherwise altering the edges 704, such that only buildable connections 706 remain. Based on the buildable connections 706, any disconnected subgraphs 708 are identified. To identify the disconnected subgraphs 708, the buildable area graph 800 may be traversed through breadth or depth traversal. If no disconnected subgraphs 708 exist, a single contiguous cluster is obtained. Further, some of the vertices 702 may end up isolated from any of the disconnected subgraphs 708. Such vertices correspond to sites that are in an area with a low enough population that they are not represented as part of any cluster. As such, in some cases, the disconnected subgraphs 708 provide a density threshold to such sites, as there is no distance between the site and its nearest neighbors that is short enough to be a buildable connection that would be economically feasible. Thus, each of the vertices 702 is subdivided into a disconnected subgraph 708 and those vertices 702 that are not relevant for consideration as part of a buildable area are eliminated. The connected buildable area graph 900 is thus a visual representation of disconnected subgraphs 708 that may support a network modification, such as a GPON overbuild. Stated differently, each of the disconnected subgraphs 708 represents a largest contiguous group of sites that is economically reasonable to consider as a single business case for GPON overbuild or other network modification.

Figure 10:
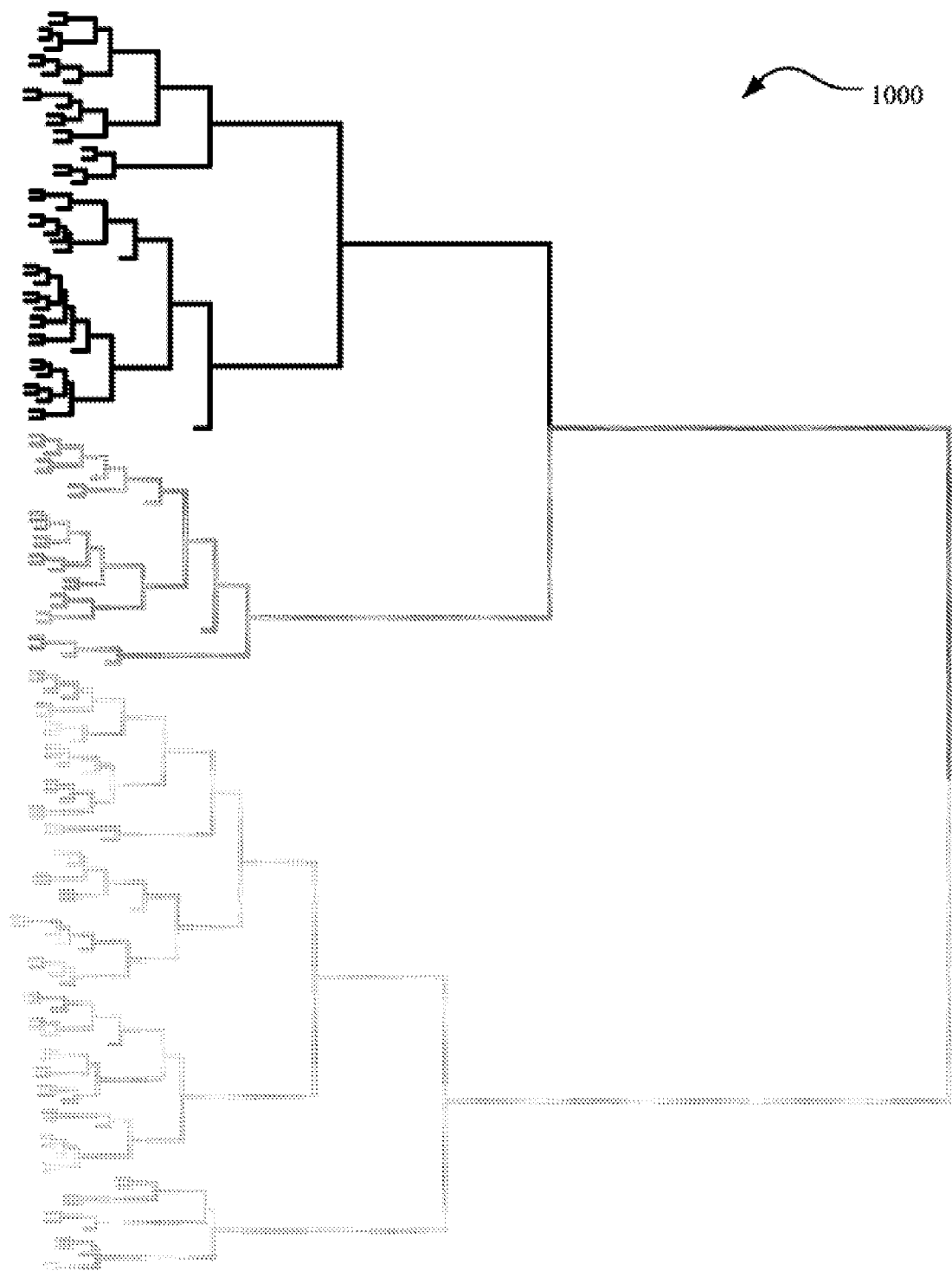
FIG. 10 illustrates an example dendrogram iteratively merging one or more investment clusters.

Turning to FIG. 10, each of buildable subgroups represented by the disconnected subgraphs 708 are analyzed to identify one or more clusters of sites within each buildable area that represent distinct investment scenarios, and each buildable area is divided into any such investment clusters identified. A clustering algorithm may be applied to separate groups of sites that share enough similarities that a more accurate picture of investment scenarios may be obtained. Some customer demographics and network characteristics may provide distinct investment cases. In other words, the clustering isolates one or more site categories that predict a potential financial return and/or financial costs associated with a network modification, such as a GPON overbuild. Such site categories may involve predictors of customer behavior (e.g., service uptake, survival rates, build-out costs, architectural constraints, and/or the like, as described herein). For example, sites clustered according to income level, ownership status, proximity, cable connection type (e.g., aerial or buried), and/or the like may provide different business cases for network modification, such as a GPON overbuild.

As such, in one implementation, a Euclidean distance between feature values may be used to define a connection distance the purpose of determining proximity of sites, which is not specific to geographic distance. Other site categories, such as demographics and other categorical data, may involve casting each site category as a numerical value with an appropriate distance relative to the values assigned other site categories. Stated differently, the clustering involves iteratively measuring a proximity between and among sites by calculating a distance (e.g., using Euclidean distance) from each site to every other site and generating a scoring associated with those distances. Other attributes may be considered as categories in determining the proximity. The definition of distance between features thus dictates a difference between business cases involving the corresponding features. The clustering, thus, isolates distinct investment opportunities to individual investment clusters with information on a predicted financial return. Furthermore, one or more clusters may be negated from consideration for network modification based on the investment scenario. For example, in the context of GPON overbuild, any investment clusters that involve only buried connections may be negated.

In one implementation, one or more of the site categories may be combined in clustering. For example, a first demographic feature may be combined with a second demographic feature in clustering. For illustrative purposes only, consider the first demographic feature to be age and the second demographic feature to be education. Both age and education are assigned numerical values within the categories. For example, if the age is below a threshold, the age may be assigned "0," and if the age is above the threshold, the age may be assigned "2." Similarly, if the education is "college educated or below," a "0" may be assigned, and if the education is "above college educated," a "1" may be assigned. The two categories may be combined to generate a clustering score of the sum of the values of age and education. A mean clustering score may then be calculated for each investment cluster in each iteration, merging sites that are most similar on a scale corresponding to the combined categorical values. For example, the scale may be: 0=low age/college educated or below; 1=high age/college educated or below; 2=low age/above college educated; and 3=high age/above college educated.

As shown in FIG. 10, in one implementation, once one or more site categories for the investment clusters are assigned numerical values for clustering scoring, each of the investment clusters are iteratively merged, as illustrated as a dendrogram 1000. In this case, each site is initially considered a separate investment cluster and iteratively merged through hierarchical agglomerative clustering. In other words, starting from individual sites, each as their own investment cluster, investment clusters are iteratively merged, such that the set of new investment clusters after each merger minimizes some merger criterion. In one implementation, the merger criterion is Ward's method, which measures an internal cluster variance with each iteration of cluster mergers minimizing the variance within the new clusters. The clustering algorithm thus iteratively proceeds through the clusters calculating a potential merger between each pair of available clusters. A merger of clusters is chosen that minimizes a variance with remaining clusters. Calculations of proximity between clusters and variance with clusters may be done with Euclidean distance, as described herein. Thus, the dendrogram 1000 may involve building an entire clustering linkage by running agglomerative clustering with a single target cluster. The dendrogram 1000 maps an optimized agglomeration of sites, such that the dendrogram 1000 may be traversed to split into clusters according to a custom criteria based on one or more categories.

Along with generating clustering score values, a connectivity matrix may be supplied to the clustering algorithm through the computation of the Delaunay triangles for the sites in the buildable area at issue and by populating a sparse connectivity matrix with a value of "1" for elements describing each pair of sites that share an edge and a value of "0" for all other elements. Agglomerative clustering then proceeds with the constraint that clusters can only be merged if they are "connected", that is, have at least one edge between constituent sites. As such, rather than just feeding each of the sites into the clustering algorithm to identify which are the most advantageous to combine, the clustering algorithm inputs the connectivity matrix, which specifies which of the sites are nearest neighbors to each other (the sparse connectivity matrix). If the sites are next to each other, they are assigned "1" and otherwise are assigned "0." The sparse connectivity matrix thus ensures that two clusters are not merged if they are not connected.

In one implementation, each site is initially considered a separate investment cluster and iteratively merged through hierarchical agglomerative clustering until the dendrogram 1000 is agglomerated to a single cluster, thereby building a full linkage of the entire buildable area, as shown in FIG. 10. In another implementation, a stopping criterion is imposed on the clustering. For example, a variance of the clustering score for the buildable area may be computed as a baseline metric for the entire buildable area. The linkage of the dendrogram 1000 is traversed, measuring the variance of the last two sub-clusters to have been merged. If their variances are above a variance threshold likely to represent different populations, the split is accepted, and the two sub-clusters are calculated as a silhouette score. The traversal of the linkage continues based on the stopping criterion, with any split that increases the silhouette score being accepted and the traversal stopping if the silhouette score decreases with the next attempted split. Further, a stopping criterion is reached based on a number of sites, where a splitting that results in a cluster of less than a pre-set minimum number of units is rejected. Once the stopping criterion is met, one or more investment clusters representing distinct investment cases for network modification are provided. While the clustering algorithm is described using hierarchical agglomerative clustering, it will be appreciated that other clustering techniques, such as divisive clustering may be utilized.

Further processing may redefine cluster edges to follow one or more logical borders (e.g., streets, rivers, city blocks, according to network architecture, etc.). The redefining may be performed manually and/or automatically using public domain shapes or other acquired logical borders for the area corresponding to the clusters. In some cases, a block ID may be applied in attribution and taken into considering when agglomerating as a soft constraint. Once the investment clusters are identified, the artificial intelligence platform 200 may analyze the investment cluster as a single business case for network modification, as described herein. The simulator 204 simulates a customer set corresponding to the sites of the investment cluster over time as a discrete event simulation for a network modification and outputs customer events. The modeler 206 generates a model of an impact of the customer events for the investment cluster, which may include performance analytics for the network modification for determining whether to upgrade or otherwise alter the network configuration for the investment cluster. For example, the performance analytics may be used to determine whether to build out a GPON overlay for the investment cluster.

As previously discussed, one or more clusters may be negated from consideration for network modification based on the investment scenario. For example, in the context of GPON overbuild, any investment clusters that involve only buried connections may be negated. In other words, the clustering analysis limits the investment clusters to sites considered to be aerially fed sites due to the relative cost of builds involving aerial feeds versus buried feeds. However, such an analysis may erroneously negate viable investment clusters that currently have buried connections but have sufficient existing architecture to be considered aerial. For example, if a site already has copper connecting the site, the site may have legacy DSL, such that the connection type of aerial versus buried is irrelevant. On the other hand, a GPON overbuild is less expensive when an aerial connection type is utilized. Where the sites are currently fed by buried copper for DSL, for example, an investment cluster may be negated for upgrade to GPON due to the buried connection. However, if the buildable area associated with the investment cluster has existing aerial feed structures, such as telephone poles, utility poles, and/or the like, the sites may be assigned an aerial feed connection for a GPON overbuild or other telecommunications build, even though an aerial feed does not currently exist.

Identifying such aerial feed structures and determining whether they may be used to qualify a site as an aerially fed site is challenging. In some cases, a static database stores feed data including an identification of which sites are aerial fed and which are buried. However, such a static database may not be updated regularly or include structures that may be used to convert a site to an aerial connection, such that there is an inaccurate analysis of the investment scenario for a buildable area, and in particular whether a site can be identified as aerially fed. For example, such status data may not take into consideration the availability of telephone poles and other aerial feed structures that are usable for aerially fed GPON overbuild. As such, many viable investment clusters are negated based on the incomplete static data.

Accordingly, feed data including an identification and location of all known aerial feed structures in a geographic area, such as the full market footprint for the telecommunications network is obtained. The location may be geographic coordinates, such as a latitude and longitude of each of the aerial feed structures. Known aerial feed structures that are owned by the operator of the telecommunications network or licensed by the operator (e.g., from a utility company) may be tracked and integrated into the feed data. Additionally, new aerial feed structures may be identified through image recognition, geolocating, and/or the like. For example, satellite image data or other image data for a buildable area may be obtained and analyzed by the intelligence platform 200 to identify and geo-locate new aerial feed structures. In one implementation, the intelligence platform 200 may be trained through machine learning to automatically identify aerial feed structures and distinguish known aerial feed structures from new aerial feed structures. The intelligence platform 200 geo-locates the new aerial feed structures, and stores the geographic location of the new aerial feed structures in the feed data with the known aerial feed structures. Street view imagery or other mechanisms may be used to confirm the new aerial feed structures are accurately identified.

In one implementation, each site in an investment cluster or buildable subgroup is assigned an aerial connection or buried connection, based on the feed data of known and new aerial feed structures in correlation with the geospatial information for the sites. More particularly, a closest aerial feed structure to each site is determined and a threshold is applied to determine whether the distance is such that the site may be assigned an aerial connection. For example, even if a site has an existing buried connection, if an aerial feed structure is within a threshold distance to the site, the site may be assigned an aerial connection. As such, during the clustering of the sites within the investment clusters, the intelligence platform 200 computes a closet aerial feed structure to each site, and the intelligence platform 200 assigns each site as having an aerial connection or a buried connection, with any investment clusters having remaining buried connections being negated.

The closest aerial feed structure to each site may be determined by dividing the buildable area into smaller grids and calculating a distance to each aerial feed structure from the grid from the site. In one implementation, the intelligence platform 200 utilizes a rectangle tree (R-Tree) algorithm to compute the closest aerial feed structure to each site. The R-Tree algorithm utilizes tree structures to accelerate a nearest neighbor search by grouping nearby sites and represents them with their minimum bounding rectangle in the next higher level of the tree. The bounding boxes are used to decide whether or not to search inside a subtree. As such, most of the aerial feed structures in the tree are never read during a search for each site. Instead, the neighbors within a given distance and the nearest neighbors of all sites relative to the aerial feed structures can efficiently be computed using a spatial join. Stated differently, the intelligence platform 200 adds the aerial feed structures to an index, which draws a box around it to store the corners of the rectangle, and builds a hierarchy with bigger rectangles until everything in the buildable area is in the largest rectangle. The intelligence platform 200 then performs a search of the R-Tree index, which traverses the hierarchy of rectangles to determine a closest aerial feed structure to each site. The traversal starts from high level bounding boxes that the site fits into and then eliminates other boxes, continuing until reaching a small selection of potential aerial feed structures for the distance computation relative to the site.

In another implementation, the intelligence platform 200 may draw a boundary around the aerial feed structures that are densely clustered in the buildable area. If only known aerial feed structures are considered, the aerial feed structures may appear sparse, such that there is an insufficient dense contiguous aerial area to support a GPON overbuild, for example, which may result in a missed opportunity. As such, the intelligence platform 200 analyzes new aerial feed structures in addition to the known aerial feed structures in the buildable area. For each of the sites, a closest aerial feed structure is identified and distance to the closest aerial feed structure and other sites are computed to determine if the area may be considered aerial. The intelligence platform 200 loops through each of the sites and calculates a distance from each site to each aerial feed structure in a boundary and determines shortest distance to an aerial feed structure within the boundary. Stated differently, the buildable area is segmented into a grid, with each grid being traversed to identify the closest aerial feed structure in the grid or adjacent grid to each site.

After the closest aerial feed structure is identified for each site, a threshold distance may be applied. If the closest aerial feed structure from a site has a distance that exceeds the threshold distance, the site is assigned a buried connection. If the closest aerial feed structure from a site has a distance within the threshold distance, the connection type for the site, which was otherwise labeled as buried based on the existing connection, may be assigned to be an aerial connection. After each site is assigned as either having a buried or aerial connection, the clustering is performed for sites with an aerial connection to identify contiguous groups of sites that represent distinct investment scenarios, as previously discussed. As a result, an investment cluster is generated where it would have been previously negated due to the existing buried connection. It will be appreciated that such an analysis may be applied to other network characteristics or site characteristics in addition or alternative to the connection type.

Figure 11:
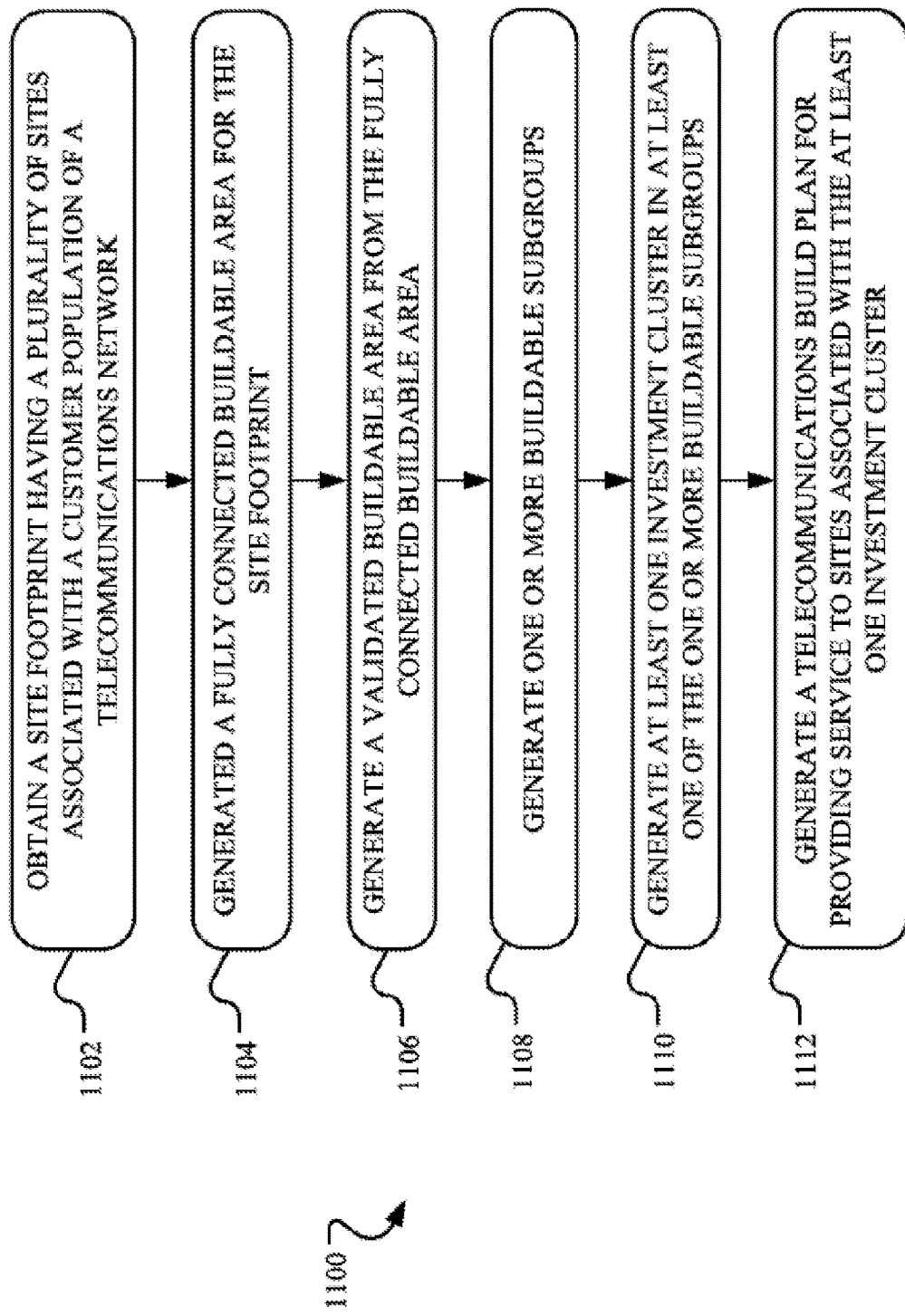
FIG. 11 illustrates example operations for generating investment clusters for intelligent network optimization.

Turning to FIG. 11, example operations 1100 for generating investment clusters for intelligent network optimization are shown. In one implementation, an operation 1102 obtains a site footprint having a plurality of sites associated with a customer population of the telecommunications network. An operation 1104 generates a fully connected buildable area for the site footprint. The fully connected buildable area includes each of the plurality of sites having a connection to at least one neighboring site, such that an entirety of the plurality of sites are connection along a set of paths. An operation 1106 generates a validated buildable area from the fully connected buildable area. In one implementation, the operation 1106 generates the validated buildable area by validating each of the connections of the plurality of sites based on at least one network constraint of the telecommunications network, such that the validated buildable area is limited to buildable connections between the plurality of sites.

An operation 1108 generates one or more buildable subgroups based on the buildable connections of the plurality of sites. The one or more buildable subgroups each defines a contiguous build area having a subset of the plurality of sites. An operation 1110 generates at least one investment cluster in at least one of the one or more buildable subgroups by clustering the subset of the plurality of sites according to at least one site category. An operation 1112 generates a telecommunications build plan for providing the telecommunications services to the subset of the plurality of sites associated with the at least one investment cluster.

As described herein, the intelligence platform provides a workflow to manage the process of evaluating potential investments in a telecommunications network. For new builds, the workflow generally considers how much is a feed to a buildable area is going to cost, how many sites are there in the buildable area, and what competition exists for the buildable area, among other factors. However, in many cases, a quick analysis of a viability of a telecommunications build is needed in real time without the burdens associated with computational simulation. For example, for a telecommunication build that is a Greenfield build where a plot of land is being developed with multiple different sites, there is no need to perform clustering. Instead, the intelligence platform reduces computation time by taking a given Greenfield market having a specific number of sites and generates a telecommunications build plan including estimated financials for the potential Greenfield build. As such, the intelligence platform 200 may pre-simulate fundamental types of sites to generate a simulation set for each type of telecommunications build. The corresponding financials for a selected simulation may be aggregated according to the number of sites in the buildable area for the telecommunications build to obtain combined estimated financials for the potential telecommunications build.

Thus, in one implementation, a simulation set is generated for each standard site type based on a site key and telecommunication build type. A simulation relevant to a particular telecommunications build may be identified using the site key and the telecommunications build type, with the output from the simulation being extracted for use in computing financials for the telecommunications build. The site key provides an envelope of possible outcomes that can be expected for a site of that type. The site key may be simulated for a particular telecommunications build type a predetermined number of times (e.g., 10,000) and averaged to generate to provide a smooth set of financials, providing an individual evaluation of a build type for a standard site. The financials for a site key may be multiplied by the number of sites in the build having a site type matching the site to obtain a complete estimated financial snapshot for the site type in a potential build. Further, where a telecommunications build has different site types, which is often the case, the complete estimated financial snapshot for each site type may be aggregated into a complete estimated financial snapshot for the potential build.

In one implementation, the simulation sets for standard sites are generated based on a plurality of disparate site keys according to the simulation methods described herein, such as with respect to FIGS. 2-5. Each site key corresponds to a site type having a distinct set of behavior. Each of the site keys are defined and simulated to provide an output of financial views of what the associated site type will do financially. The site keys may be stored in a lookup table according to one or more demographic parameters, site parameters, and/or the like. Each of the site keys segments the customer population associated with the telecommunications network by different dimensions. The intelligence platform 200 analyzes each site key generated to determine whether the site key describes a different segment of the customer population from the other standard site keys. Stated differently, a site key is added to the lookup table where the penetration rate for the segment of the customer population associated with the site key is robustly different from the penetration rates for the segments of the customer population corresponding to the existing standard site keys in the sense that they describe different population behavior characteristics. For example, the intelligence platform 200 may determine whether the penetration rate for a site key corresponding to owners in high income areas serviced by GPON technology has different population behavior characteristics from renters in low income areas serviced by GPON technology.

For each of the site keys, a simulation set with a plurality of simulations may be generated to provide quick finical information for different types of build scenarios. The plurality of simulations may include, for example, a base case where the site already exists with existing customers; a base case where the site already exists with no customers; a Brownfield build overbuilding an existing architecture with existing customers; a Brownfield build overbuilding an existing architecture with no customers; a Greenfield build creating a new build with existing customers; and a Greenfield build creating a new build with no customers.

In some cases, a telecommunications build will be dictated in part by an agreement. For example, a build involving sites forming part of a multiple dwelling unit complex, such as an apartment building, condominium building, a mixed use commercial development, and/or the like, may involve an exclusive contract providing a bulk deal servicing all the associated sites. Such an exclusive deal removes competitors as a factor, since each customer is limited to accepting the service or not having service. As such, agreement types for a build may impact financial performance and thus be a parameter from which a site key is generated.

Overall, each site key outputs a distinct customer performance without being too specific. In other words, the site keys focus on the groups that have distinct financial performance within a build and represent an average of each distinct group. One or more site keys are dictated by the specifics of each build and may be selected to analyze the financials of the build. For example, a drop down menu listing the site keys with differing level of detail may be used to select an appropriate site key. Alternatively or additionally, site keys may be automatically selected by the intelligence platform 200 based on an analysis of the build. The site key with the most specific detail available may be selected. For example, if the only information known about a site in a build is that the site is in a high income multiple dwelling unit, that site key may be selected. However, if it is also known that that the site is owned, a site key for high income, owned multiple dwelling unit is selected. Based on the financials output for the telecommunication build, a telecommunication build plan is generated, including a determination of whether to move forward with the build, modify the build, or not move forward with the build.

In one implementation, the intelligence platform 200 obtains a plurality of demographic parameters for a customer population associated with a telecommunications network and a plurality of site parameters for sites associated with the customer population of the telecommunications network. The plurality of demographic parameters may correspond to characteristics of customers in the customer population of the telecommunication network. In one implementation, the customers include existing customers, new customers, and/or potential customers. The plurality of demographic parameters may include, for example, income level, age, education level of the customers, and/or the like.

The plurality of site parameters correspond to characteristics of the sites associated with the customer population of the telecommunications network. In one implementation, the sites include at least one of existing sites, new sites, or proposed sites. The plurality of site parameters may include ownership status, connection type, service type, occupancy status, unit type, node type of a communications node for the sites, and/or the like. The node type may be CoIP, FTTN, or FTTP, for example. The unit type includes, without limitation, at least one of a multiple dwelling unit, a single family unit, a living unit, a business unit, and/or a customer unit. The ownership status includes leased, owned, and/or the like.

The intelligence platform 200 generates a site key having a subset of the plurality of demographic parameters and/or a subset of the plurality of site parameters. The site key provides a penetration rate for a segment of the customer population associated with the telecommunication services. The intelligence platform 200 generates a simulation set for the site key. The simulation set includes a plurality of simulations for the site key, with each of the simulations having a set of customer events for a telecommunications build type. The set of customer events may be generated by simulating a customer set for the site key over time through a discrete event simulation, as described herein. The customer events include a customer count, a revenue curve, and/or the like, as described herein. The discrete event simulation may further be one of a plurality of discrete event simulations with the set of customer events being an average of a plurality of customer events generated through the plurality of discrete event simulations.

In one implementation, the telecommunications build type is: a base build; a brownfield build; or a greenfield build, and the plurality of simulations for the site key include one or more of: a base build with no customers simulation; a base build with existing customers simulation; a brownfield build with no customers simulation; a brownfield build with existing customers simulation; a greenfield build with no customers simulation; and a greenfield build with existing customers simulation. The simulation set may be generated for the site key based on a determination of whether the site key has behavioral characteristics distinct from one or more standard site keys for the telecommunication network. For example, the determination of whether the site key has behavioral characteristics distinct from the one or more standard site keys may include comparing a corresponding penetration rate for a corresponding segment of the customer population for each of the one or more standard site keys to the penetration rate for the site key.

The simulation set may be stored in at least one database, with each of the plurality of simulations in the simulation set being selectable to generate a telecommunications build plan for providing the telecommunications services to a telecommunications buildable area of the telecommunications network.

Figure 12:
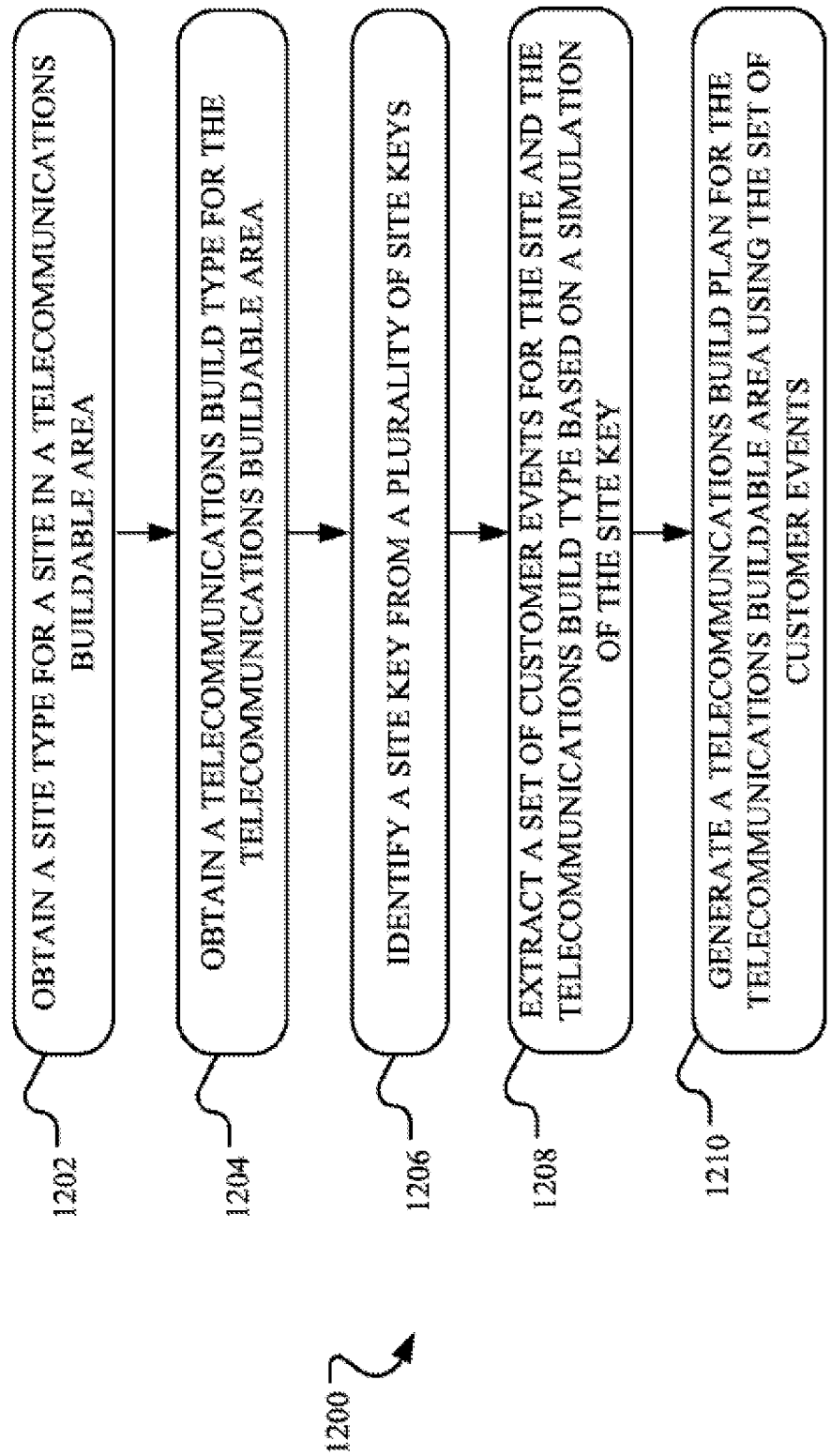
FIG. 12 illustrates example operations for generating a simulation set for intelligent network optimization.

FIG. 12 illustrates example operations 1200 for generating a simulation set for intelligent network optimization. In one implementation, an operation 1202 obtains a site type for a site in a telecommunications buildable area for providing telecommunication services in a telecommunications network, and operation 1204 obtains a telecommunications build type for the telecommunications buildable area.

An operation 1206 identifies a site key from a plurality of site keys by matching the site type to the site key. In one implementation, the operation 1206 matches the site key to the site type based on one or more of at least one demographic parameter and at least one site parameter. An operation 1208 extracts a set of customer events for the site and the telecommunications build type based on a simulation of the site key. The simulation of the site key may be selected from a simulation set based on the telecommunications build type. In one implementation, the simulation of the site key outputs the set of customer events generated through a discrete event simulation of a customer set for the site key over time, as described herein. An operation 1210 generates a telecommunications build plan for the telecommunications buildable area using the set of customer events. The telecommunications build plan may be generated based on different sets of customer events extracted for different site keys corresponding to different site types in the telecommunications buildable area. The telecommunications build plan may be output for presentation using a presentation system.

Figure 13:
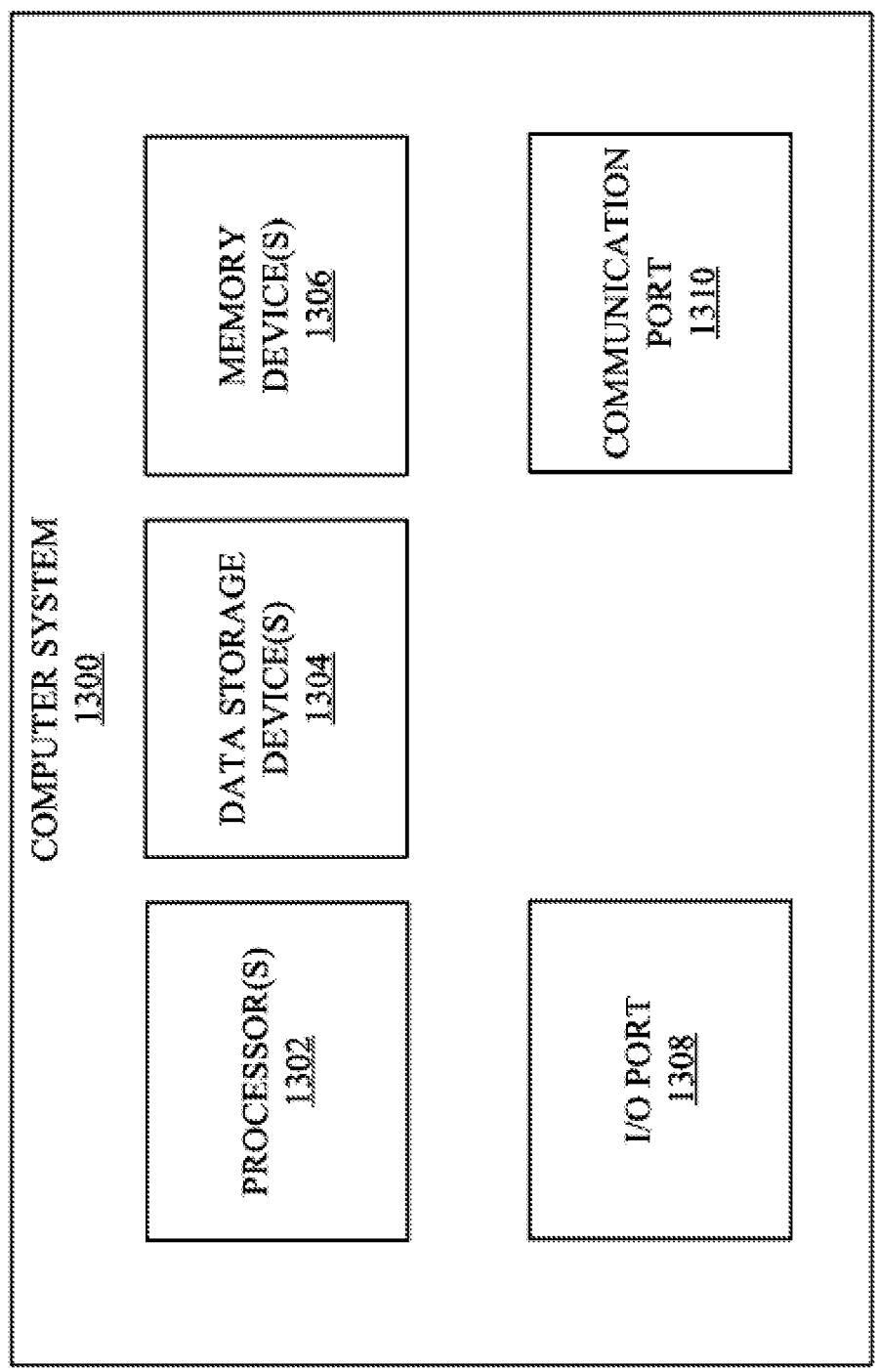
FIG. 13 is a block diagram of an example computing system that may implement various systems and methods of the presently disclosed technology.

Referring to FIG. 13, a detailed description of an example computing system 1300 having one or more computing units that may implement various systems and methods discussed herein is provided. The computing system 1300 may be applicable to the artificial intelligence platform 200, the neural network 202, the simulator 204, the modeler 206, and other computing or network devices. It will be appreciated that specific implementations of these devices may be of differing possible specific computing architectures not all of which are specifically discussed herein but will be understood by those of ordinary skill in the art.

The computer system 1300 may be a computing system is capable of executing a computer program product to execute a computer process. Data and program files may be input to the computer system 1300, which reads the files and executes the programs therein. Some of the elements of the computer system 1300 are shown in FIG. 13, including one or more hardware processors 1302, one or more data storage devices 1304, one or more memory devices 1308, and/or one or more ports 1308-1310. Additionally, other elements that will be recognized by those skilled in the art may be included in the computing system 1300 but are not explicitly depicted in FIG. 13 or discussed further herein. Various elements of the computer system 1300 may communicate with one another by way of one or more communication buses, point-to-point communication paths, or other communication means not explicitly depicted in FIG. 13.

The processor 1302 may include, for example, a central processing unit (CPU), a microprocessor, a microcontroller, a digital signal processor (DSP), and/or one or more internal levels of cache. There may be one or more processors 1302, such that the processor 1302 comprises a single central-processing unit, or a plurality of processing units capable of executing instructions and performing operations in parallel with each other, commonly referred to as a parallel processing environment.

The computer system 1300 may be a conventional computer, a distributed computer, or any other type of computer, such as one or more external computers made available via a cloud computing architecture. The presently described technology is optionally implemented in software stored on the data stored device(s) 1304, stored on the memory device(s) 1306, and/or communicated via one or more of the ports 1308-1310, thereby transforming the computer system 1300 in FIG. 13 to a special purpose machine for implementing the operations described herein. Examples of the computer system 1300 include personal computers, terminals, workstations, mobile phones, tablets, laptops, personal computers, multimedia consoles, gaming consoles, set top boxes, and the like.

The one or more data storage devices 1304 may include any non-volatile data storage device capable of storing data generated or employed within the computing system 1300, such as computer executable instructions for performing a computer process, which may include instructions of both application programs and an operating system (OS) that manages the various components of the computing system 1300. The data storage devices 1304 may include, without limitation, magnetic disk drives, optical disk drives, solid state drives (SSDs), flash drives, and the like. The data storage devices 1304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1306 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1304 and/or the memory devices 1306, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1300 includes one or more ports, such as an input/output (I/O) port 1308 and a communication port 1310, for communicating with other computing, network, or vehicle devices. It will be appreciated that the ports 1308-1310 may be combined or separate and that more or fewer ports may be included in the computer system 1300.

The I/O port 1308 may be connected to an I/O device, or other device, by which information is input to or output from the computing system 1300. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1300 via the I/O port 1308. Similarly, the output devices may convert electrical signals received from computing system 1300 via the I/O port 1308 into signals that may be sensed as output by a human, such as sound, light, and/or touch. The input device may be an alphanumeric input device, including alphanumeric and other keys for communicating information and/or command selections to the processor 1302 via the I/O port 1308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1300 via the I/O port 1308. For example, an electrical signal generated within the computing system 1300 may be converted to another type of signal, and/or vice-versa. In one implementation, the environment transducer devices sense characteristics or aspects of an environment local to or remote from the computing device 1300, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1300, such as, physical movement of some object (e.g., a mechanical actuator), heating or cooling of a substance, adding a chemical substance, and/or the like.

In one implementation, a communication port 1310 is connected to a network by way of which the computer system 1300 may receive network data useful in executing the methods and systems set out herein as well as transmitting information and network configuration changes determined thereby. Stated differently, the communication port 1310 connects the computer system 1300 to one or more communication interface devices configured to transmit and/or receive information between the computing system 1300 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1310 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1310 may communicate with an antenna or other link for electromagnetic signal transmission and/or reception.

In an example implementation, customer information, dynamic simulation inputs, network data, and software and other modules and services may be embodied by instructions stored on the data storage devices 1304 and/or the memory devices 1306 and executed by the processor 1302. The computer system 1300 may be integrated with or otherwise form part of various components of the network environment 100.

The system set forth in FIG. 13 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for intelligent node type selection in a telecommunications network, the method comprising:
generating a set of customer events for a node type of a communications node using a simulator, the set of customer events generated by simulating a customer set for the communications node over time through a discrete event simulation;

modeling an impact of the customer events for the node type of the communications node; and identifying the node type from a plurality of node types for a telecommunications build based on the impact of the customer events for the node type.

2. The method of claim 1, wherein the plurality of node types includes at least one of central office fed internet protocol (CoIP), fiber to the node (FTTN), or fiber to the premises (FTTP).

3. The method of claim 1, wherein the customer set is generated by a neural network based on a new sales rate and an offer distribution.

4. The method of claim 1, wherein the customer node is within a buildable area, the set of customer events being generated for the telecommunications build for the buildable area.

5. The method of claim 1, wherein the telecommunications build is a Passive Optical Network (PON) overlay.

6. The method of claim 1, wherein the telecommunications build is a greenfield build or a brownfield build.

7. The method of claim 1, wherein the set of customer events includes one or more of a customer count and a revenue curve.

8. The method of claim 1, wherein the discrete event simulation is replicated using a plurality of random seed numbers.

9. A telecommunications system comprising:

a wire center deployed in a telecommunications network;

a plurality of sites, each of the sites corresponding to at least one customer of a service provided by the telecommunications network;

a communications node connecting the plurality of sites to the wire center, the communications node having a node type selected based on a model of an impact of customer events for the node type, the customer events generated by simulating a customer set over time through a discrete event simulation; and an artificial intelligence platform modeling an impact of the customer events for the node type of the communications node, and identifying the node type from a plurality of node types for a telecommunications build based on the impact of the customer events for the node type.

10. The system of claim 9, wherein the node type is central office fed internet protocol (CoIP), fiber to the node (FTTN), or fiber to the premises (FTTP).

11. The system of claim 9, wherein the new customer set is generated by a neural network based on a new sales rate and an offer distribution.

12. The system of claim 9, wherein the node type is associated with a telecommunications build for a buildable area of the telecommunications network.

13. The system of claim 12, wherein the telecommunications build for the buildable area is a greenfield build or a brownfield build.

14. The system of claim 12, wherein a customer node is within a buildable area, the set of customer events being generated for the telecommunications build for the buildable area.

15. The system of claim 12, wherein the set of customer events includes one or more of a customer count and a revenue curve.

16. The system of claim 12, wherein the discrete event simulation is replicated using a plurality of random seed numbers.

* * * * *